US008105155B2

(12) United States Patent
Kelly et al.

(10) Patent No.: US 8,105,155 B2
(45) Date of Patent: Jan. 31, 2012

(54) METHOD FOR IMPLEMENTING LOSS LIMITS

(75) Inventors: Bryan M. Kelly, Alamo, CA (US); Patricia A. McMahan, Vineland, NJ (US); Ryan Randazzo, Glendora, NJ (US); Alexandra Taylor, Egg Harbor Township, NJ (US); Frank Silvestro, Tuckerton, NJ (US); Paul C. McLaughlin, Brigantine, NJ (US)

(73) Assignee: Bally Gaming, Inc., Las Vegas, NV (US)

( * ) Notice: Subject to any disclaimer, the term of this patent is extended or adjusted under 35 U.S.C. 154(b) by 357 days.

(21) Appl. No.: 12/032,348

(22) Filed: Feb. 15, 2008

(65) Prior Publication Data

US 2008/0214293 A1 Sep. 4, 2008

Related U.S. Application Data

(63) Continuation-in-part of application No. 11/470,605, filed on Sep. 6, 2005.

(60) Provisional application No. 60/714,754, filed on Sep. 7, 2005.

(51) Int. Cl.
*A63F 13/00* (2006.01)

(52) U.S. Cl. ................ 463/25; 463/29; 463/42; 463/16

(58) Field of Classification Search .................... 463/16, 463/25, 29, 42
See application file for complete search history.

(56) References Cited

U.S. PATENT DOCUMENTS

| | | | | |
|---|---|---|---|---|
| 2001/0031663 | A1* | 10/2001 | Johnson | 463/42 |
| 2002/0039921 | A1* | 4/2002 | Rowe et al. | 463/25 |
| 2005/0282638 | A1* | 12/2005 | Rowe | 463/42 |
| 2006/0189367 | A1* | 8/2006 | Nguyen et al. | 463/16 |
| 2007/0032295 | A1* | 2/2007 | Muir et al. | 463/29 |

* cited by examiner

*Primary Examiner* — Peter DungBa Vo
*Assistant Examiner* — Jeffrey Wong
(74) *Attorney, Agent, or Firm* — Steptoe & Johnson LLP

(57) ABSTRACT

A loss limit system and method automatically tracks a player's entry and cash play, and does not allow them to play more than an allotted dollar amount during a given time frame or lose more than the established limit. Typically, excursions of play sessions are set up by day. Play is tracked at gaming machines and locked from all other play during card in at a machine. No other play is allowed at gaming machines, auto table rating systems or open table ratings, purchase of tokens, unless buy-in has not reached the loss limit for the session. At rollover, players are allowed to play again until they meet the same criteria for loss limit.

11 Claims, 39 Drawing Sheets

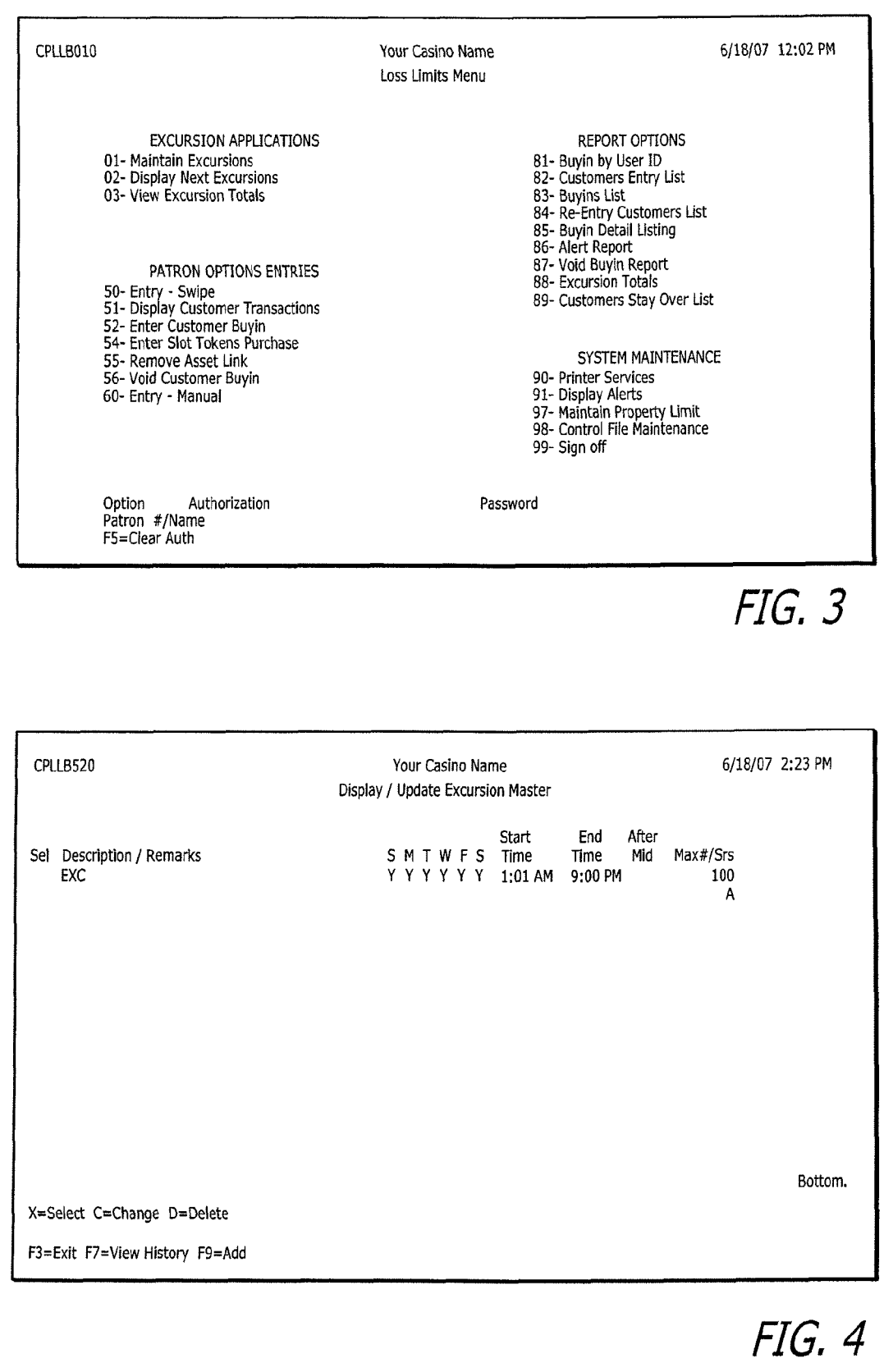

CPLLB010 Your Casino Name 6/18/07 12:02 PM

Loss Limits Menu

EXCURSION APPLICATIONS
01- Maintain Excursions
02- Display Next Excursions
03- View Excursion Totals PATRON OPTIONS ENTRIES
50- Entry - Swipe
51- Display Customer Transactions
52- Enter Customer Buyin
54- Enter Slot Tokens Purchase
55- Remove Asset Link
56- Void Customer Buyin
60- Entry - Manual REPORT OPTIONS
81- Buyin by User ID
82- Customers Entry List
83- Buyins List
84- Re-Entry Customers List
85- Buyin Detail Listing
86- Alert Report
87- Void Buyin Report
88- Excursion Totals
89- Customers Stay Over List SYSTEM MAINTENANCE
90- Printer Services
91- Display Alerts
97- Maintain Property Limit
98- Control File Maintenance
99- Sign off Option Authorization Password
Patron #/Name
F5=Clear Auth

FIG. 3

CPLLB520 Your Casino Name 6/18/07 2:23 PM

Display / Update Excursion Master

| Sel | Description / Remarks | S | M | T | W | F | S | Start Time | End Time | After Mid | Max#/Srs |
|---|---|---|---|---|---|---|---|---|---|---|---|
| | EXC | Y | Y | Y | Y | Y | Y | 1:01 AM | 9:00 PM | | 100<br>A |

Bottom.

X=Select C=Change D=Delete

F3=Exit F7=View History F9=Add

FIG. 4

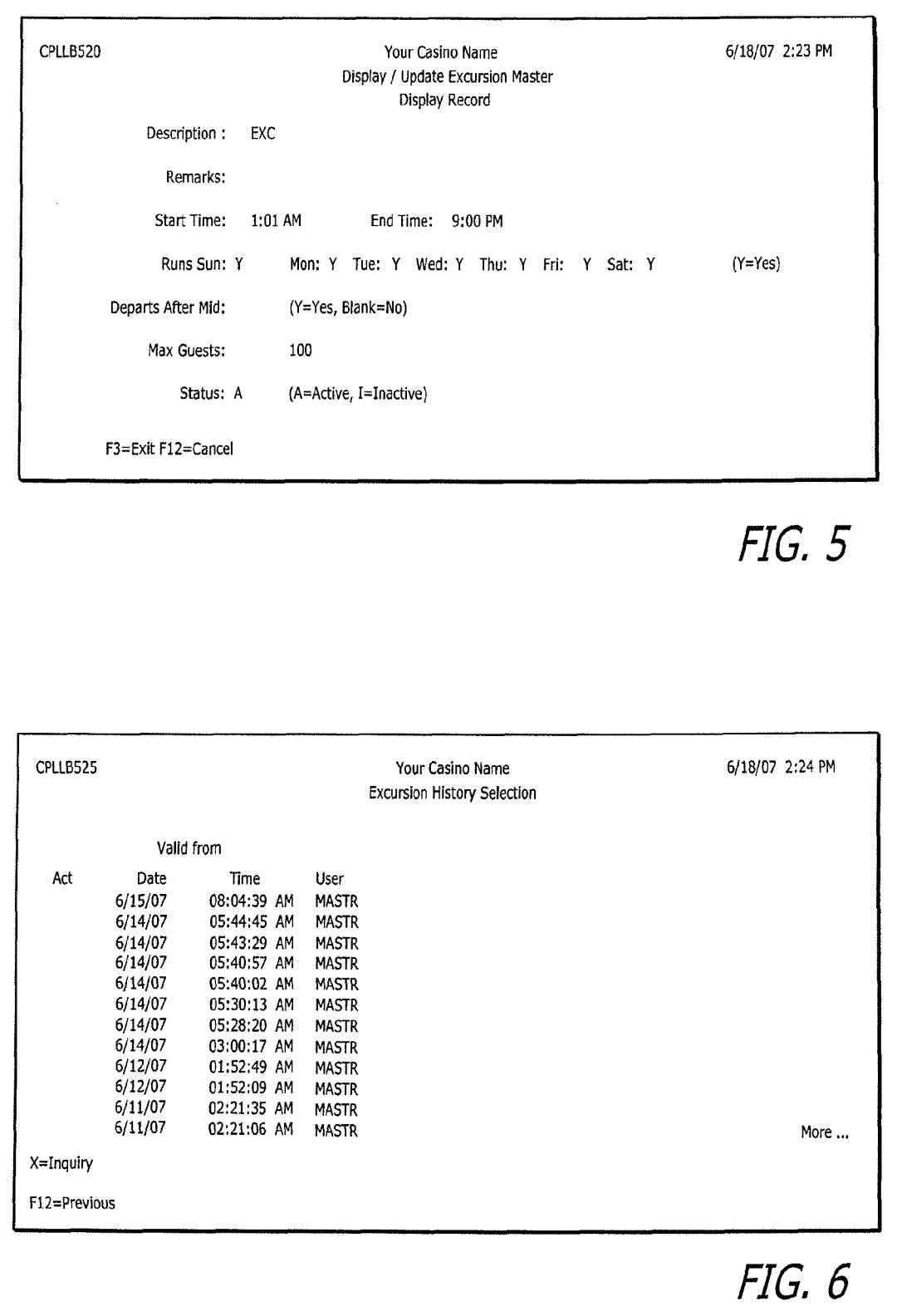

CPLLB520 Your Casino Name 6/18/07 2:23 PM

Display / Update Excursion Master

Display Record

Description : EXC

Remarks:

Start Time: 1:01 AM End Time: 9:00 PM

Runs Sun: Y Mon: Y Tue: Y Wed: Y Thu: Y Fri: Y Sat: Y (Y=Yes)

Departs After Mid: (Y=Yes, Blank=No)

Max Guests: 100

Status: A (A=Active, I=Inactive)

F3=Exit F12=Cancel

FIG. 5

CPLLB525 Your Casino Name 6/18/07 2:24 PM

Excursion History Selection

| Act | Valid from Date | Time | User |
|---|---|---|---|
| | 6/15/07 | 08:04:39 AM | MASTR |
| | 6/14/07 | 05:44:45 AM | MASTR |
| | 6/14/07 | 05:43:29 AM | MASTR |
| | 6/14/07 | 05:40:57 AM | MASTR |
| | 6/14/07 | 05:40:02 AM | MASTR |
| | 6/14/07 | 05:30:13 AM | MASTR |
| | 6/14/07 | 05:28:20 AM | MASTR |
| | 6/14/07 | 03:00:17 AM | MASTR |
| | 6/12/07 | 01:52:49 AM | MASTR |
| | 6/12/07 | 01:52:09 AM | MASTR |
| | 6/11/07 | 02:21:35 AM | MASTR |
| | 6/11/07 | 02:21:06 AM | MASTR |

More ...

X=Inquiry

F12=Previous

FIG. 6

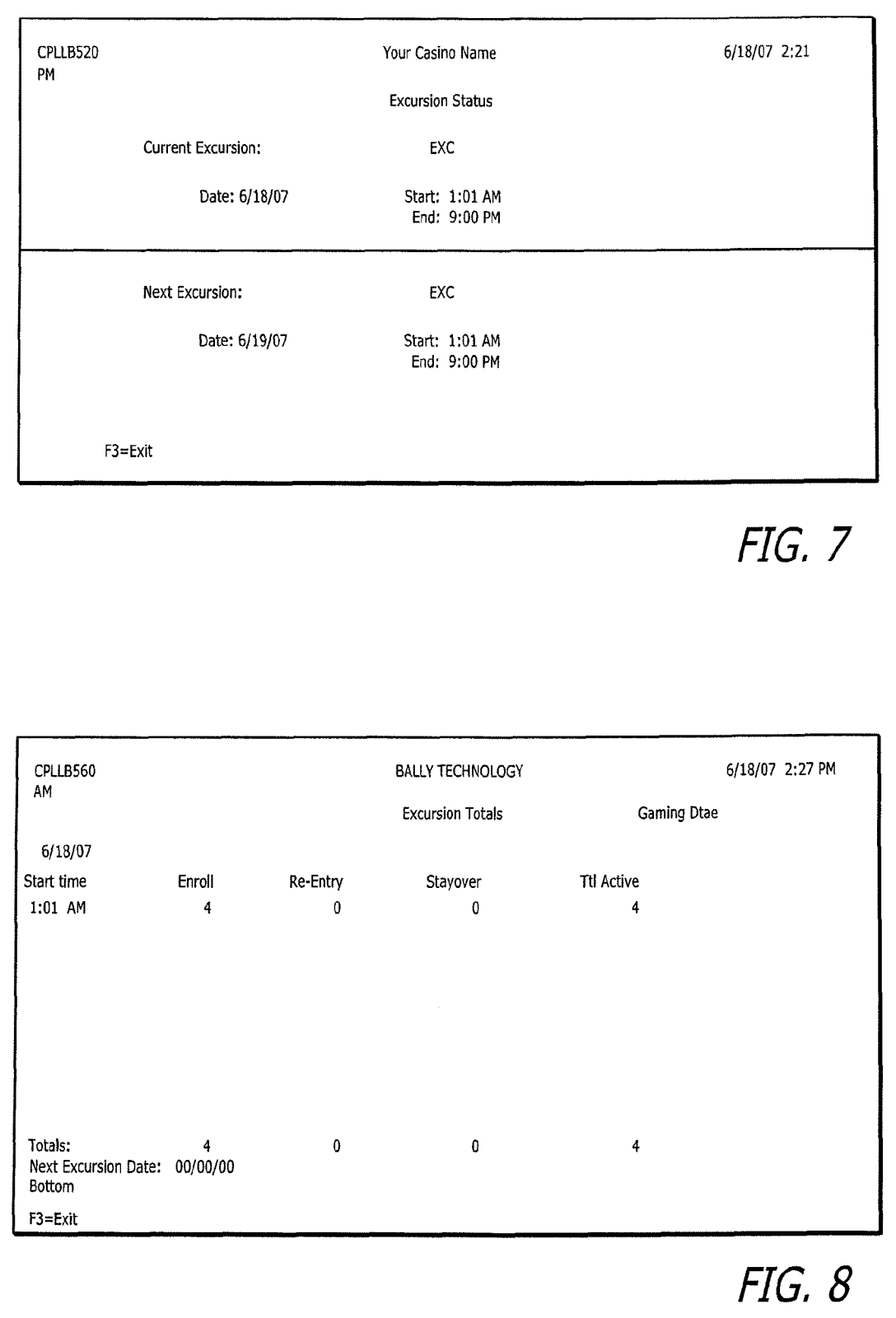

CPLLB520 Your Casino Name 6/18/07 2:21
PM

Excursion Status

Current Excursion: EXC

Date: 6/18/07 Start: 1:01 AM
End: 9:00 PM

Next Excursion: EXC

Date: 6/19/07 Start: 1:01 AM
End: 9:00 PM

F3=Exit

FIG. 7

CPLLB560 BALLY TECHNOLOGY 6/18/07 2:27 PM
AM

Excursion Totals Gaming Dtae

6/18/07

| Start time | Enroll | Re-Entry | Stayover | Ttl Active |
|---|---|---|---|---|
| 1:01 AM | 4 | 0 | 0 | 4 |
| Totals: | 4 | 0 | 0 | 4 |

Next Excursion Date: 00/00/00
Bottom

F3=Exit

FIG. 8

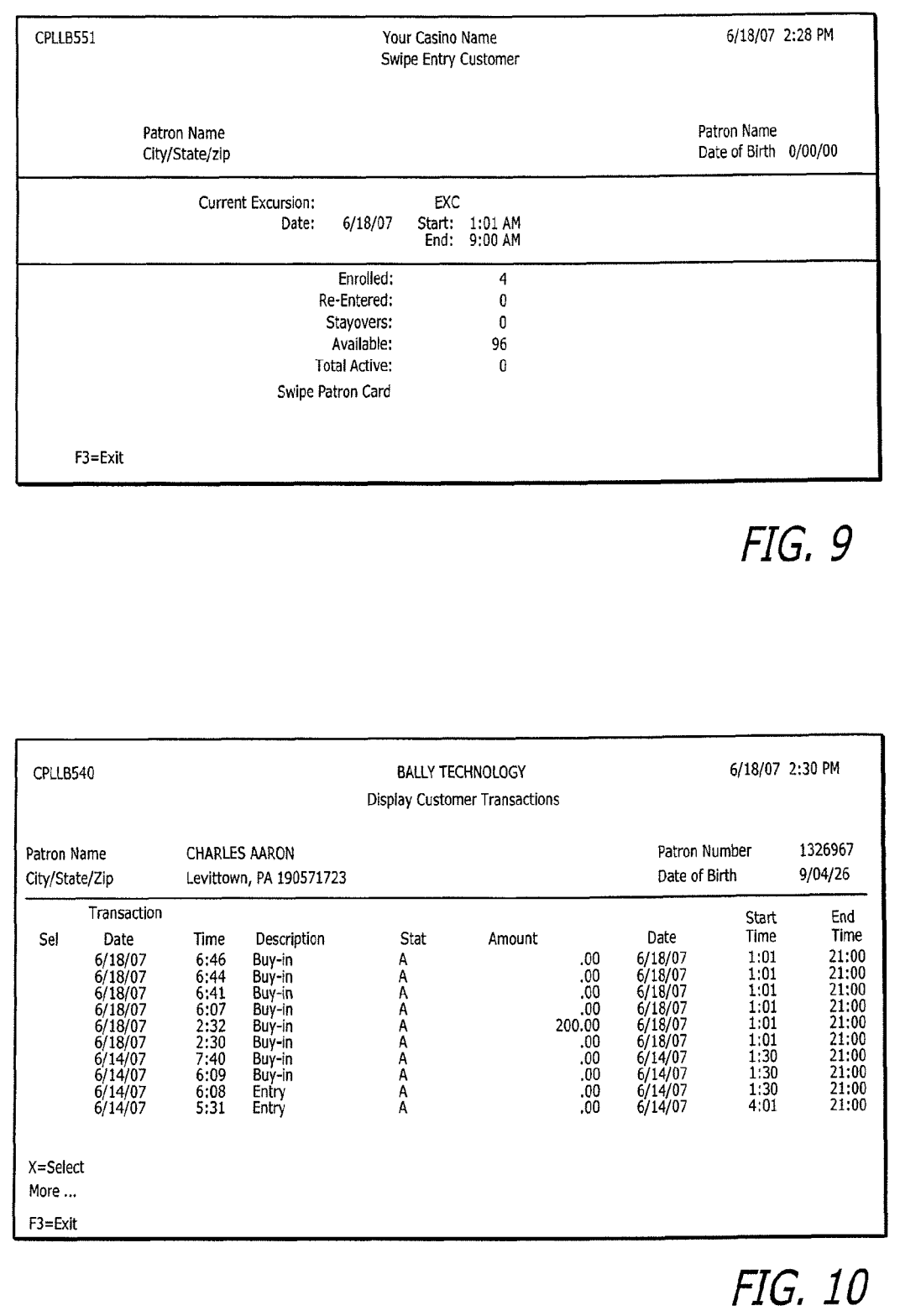

CPLLB551 Your Casino Name 6/18/07 2:28 PM
Swipe Entry Customer

Patron Name
City/State/zip

Patron Name
Date of Birth 0/00/00

Current Excursion: EXC
Date: 6/18/07 Start: 1:01 AM
End: 9:00 AM

Enrolled: 4
Re-Entered: 0
Stayovers: 0
Available: 96
Total Active: 0

Swipe Patron Card

F3=Exit

FIG. 9

CPLLB540 BALLY TECHNOLOGY 6/18/07 2:30 PM
Display Customer Transactions

Patron Name CHARLES AARON
City/State/Zip Levittown, PA 190571723

Patron Number 1326967
Date of Birth 9/04/26

| Sel | Transaction Date | Time | Description | Stat | Amount | Date | Start Time | End Time |
|---|---|---|---|---|---|---|---|---|
| | 6/18/07 | 6:46 | Buy-in | A | .00 | 6/18/07 | 1:01 | 21:00 |
| | 6/18/07 | 6:44 | Buy-in | A | .00 | 6/18/07 | 1:01 | 21:00 |
| | 6/18/07 | 6:41 | Buy-in | A | .00 | 6/18/07 | 1:01 | 21:00 |
| | 6/18/07 | 6:07 | Buy-in | A | .00 | 6/18/07 | 1:01 | 21:00 |
| | 6/18/07 | 2:32 | Buy-in | A | 200.00 | 6/18/07 | 1:01 | 21:00 |
| | 6/18/07 | 2:30 | Buy-in | A | .00 | 6/18/07 | 1:01 | 21:00 |
| | 6/14/07 | 7:40 | Buy-in | A | .00 | 6/14/07 | 1:30 | 21:00 |
| | 6/14/07 | 6:09 | Buy-in | A | .00 | 6/14/07 | 1:30 | 21:00 |
| | 6/14/07 | 6:08 | Entry | A | .00 | 6/14/07 | 1:30 | 21:00 |
| | 6/14/07 | 5:31 | Entry | A | .00 | 6/14/07 | 4:01 | 21:00 |

X=Select
More ...
F3=Exit

FIG. 10

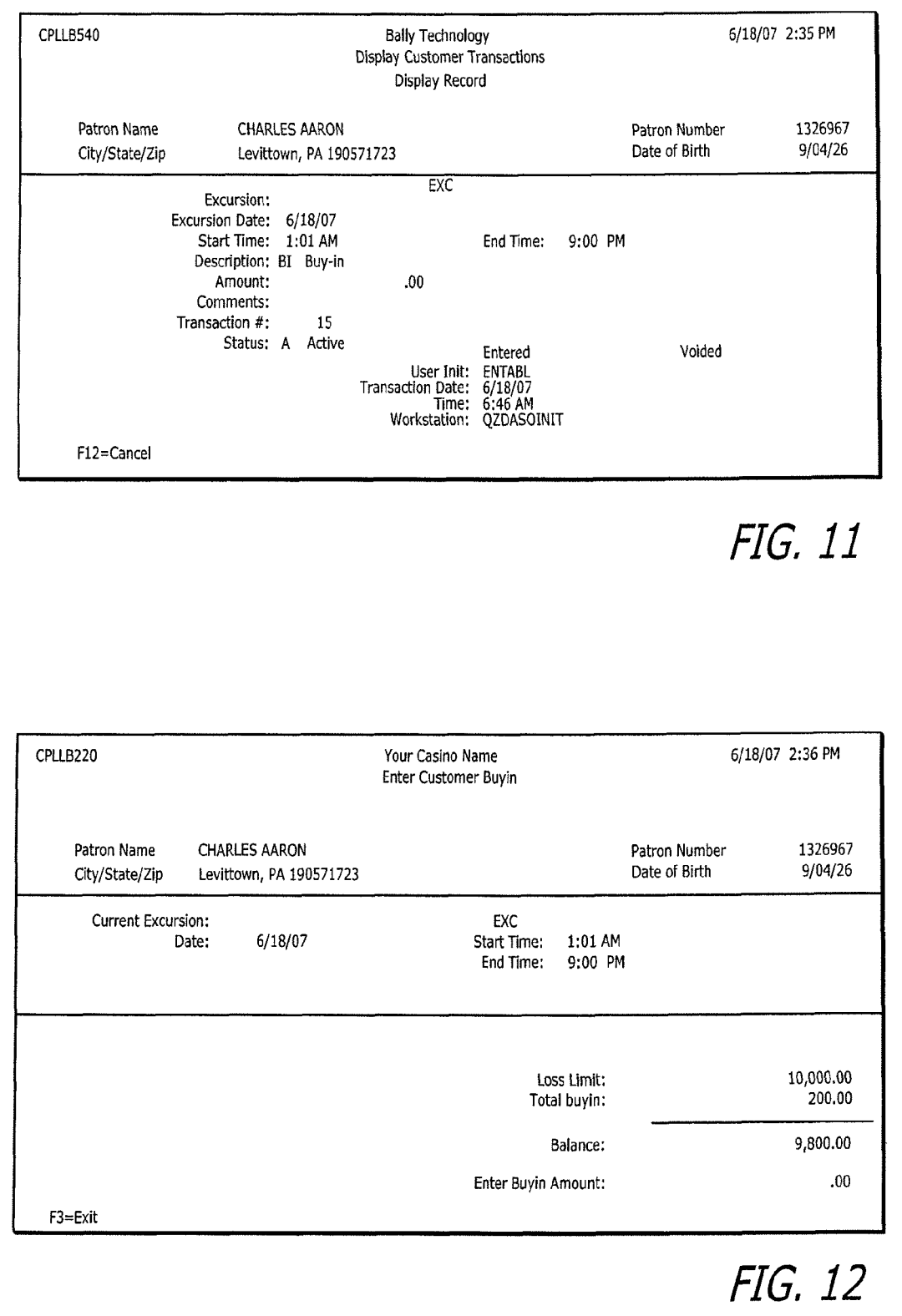

CPLLB540 | Bally Technology | 6/18/07 2:35 PM
Display Customer Transactions
Display Record Patron Name CHARLES AARON | Patron Number 1326967
City/State/Zip Levittown, PA 190571723 | Date of Birth 9/04/26

Excursion: EXC
Excursion Date: 6/18/07
Start Time: 1:01 AM | End Time: 9:00 PM
Description: BI Buy-in
Amount: .00
Comments:
Transaction #: 15
Status: A Active

| | Entered | Voided |
|---|---|---|
| User Init: | ENTABL | |
| Transaction Date: | 6/18/07 | |
| Time: | 6:46 AM | |
| Workstation: | QZDASOINIT | |

F12=Cancel

*FIG. 11*

CPLLB220 | Your Casino Name | 6/18/07 2:36 PM
Enter Customer Buyin

Patron Name CHARLES AARON | Patron Number 1326967
City/State/Zip Levittown, PA 190571723 | Date of Birth 9/04/26

Current Excursion: EXC
Date: 6/18/07 | Start Time: 1:01 AM
End Time: 9:00 PM

Loss Limit: 10,000.00
Total buyin: 200.00

Balance: 9,800.00

Enter Buyin Amount: .00

F3=Exit

*FIG. 12*

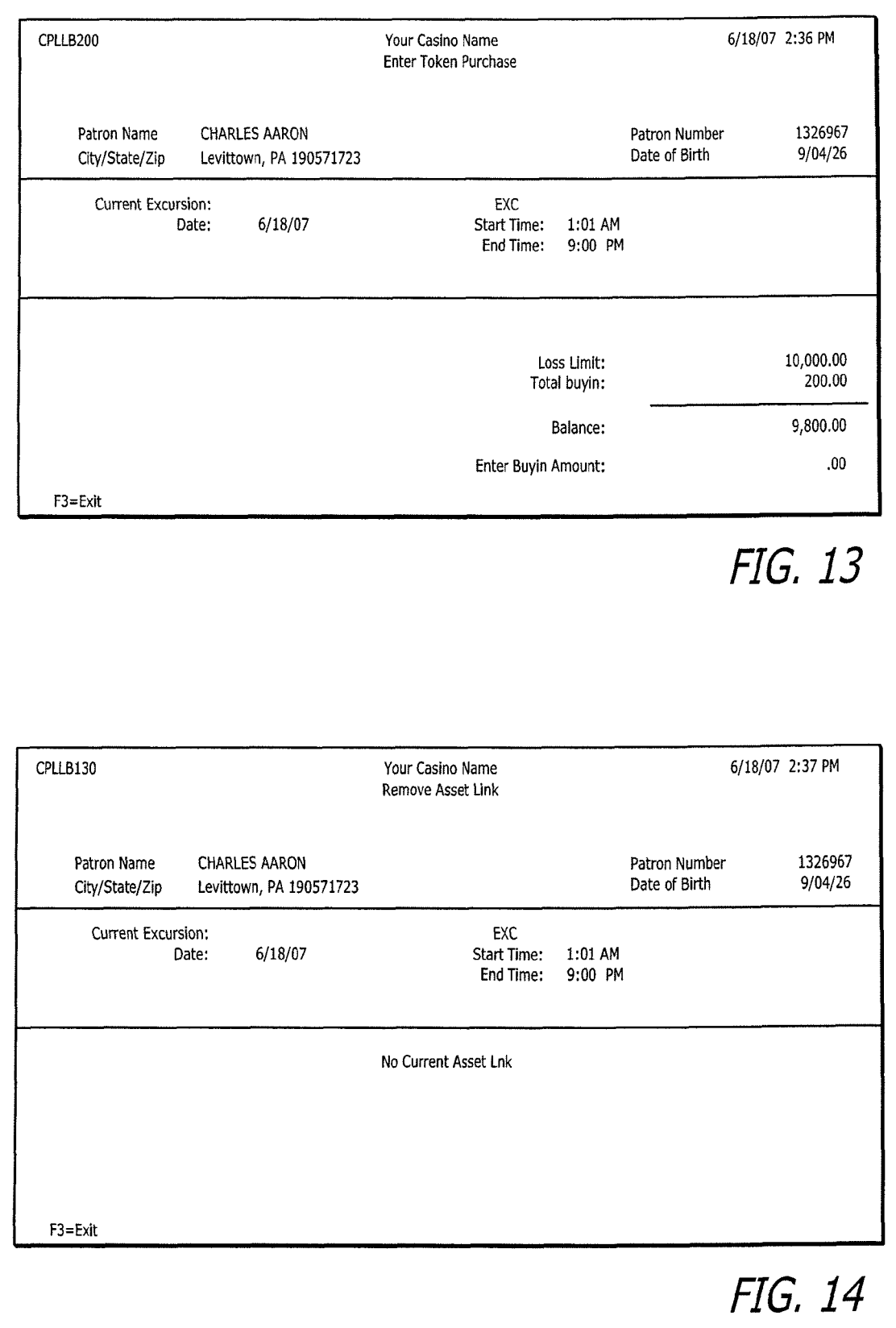

CPLLB200 | Your Casino Name | 6/18/07 2:36 PM

Enter Token Purchase

| | | | |
|---|---|---|---|
| Patron Name | CHARLES AARON | Patron Number | 1326967 |
| City/State/Zip | Levittown, PA 190571723 | Date of Birth | 9/04/26 |

| | | | |
|---|---|---|---|
| Current Excursion: | | EXC | |
| Date: | 6/18/07 | Start Time: | 1:01 AM |
| | | End Time: | 9:00 PM |

| | |
|---|---|
| Loss Limit: | 10,000.00 |
| Total buyin: | 200.00 |
| Balance: | 9,800.00 |
| Enter Buyin Amount: | .00 |

F3=Exit

FIG. 13

CPLLB130 | Your Casino Name | 6/18/07 2:37 PM

Remove Asset Link

| | | | |
|---|---|---|---|
| Patron Name | CHARLES AARON | Patron Number | 1326967 |
| City/State/Zip | Levittown, PA 190571723 | Date of Birth | 9/04/26 |

| | | | |
|---|---|---|---|
| Current Excursion: | | EXC | |
| Date: | 6/18/07 | Start Time: | 1:01 AM |
| | | End Time: | 9:00 PM |

No Current Asset Lnk

F3=Exit

FIG. 14

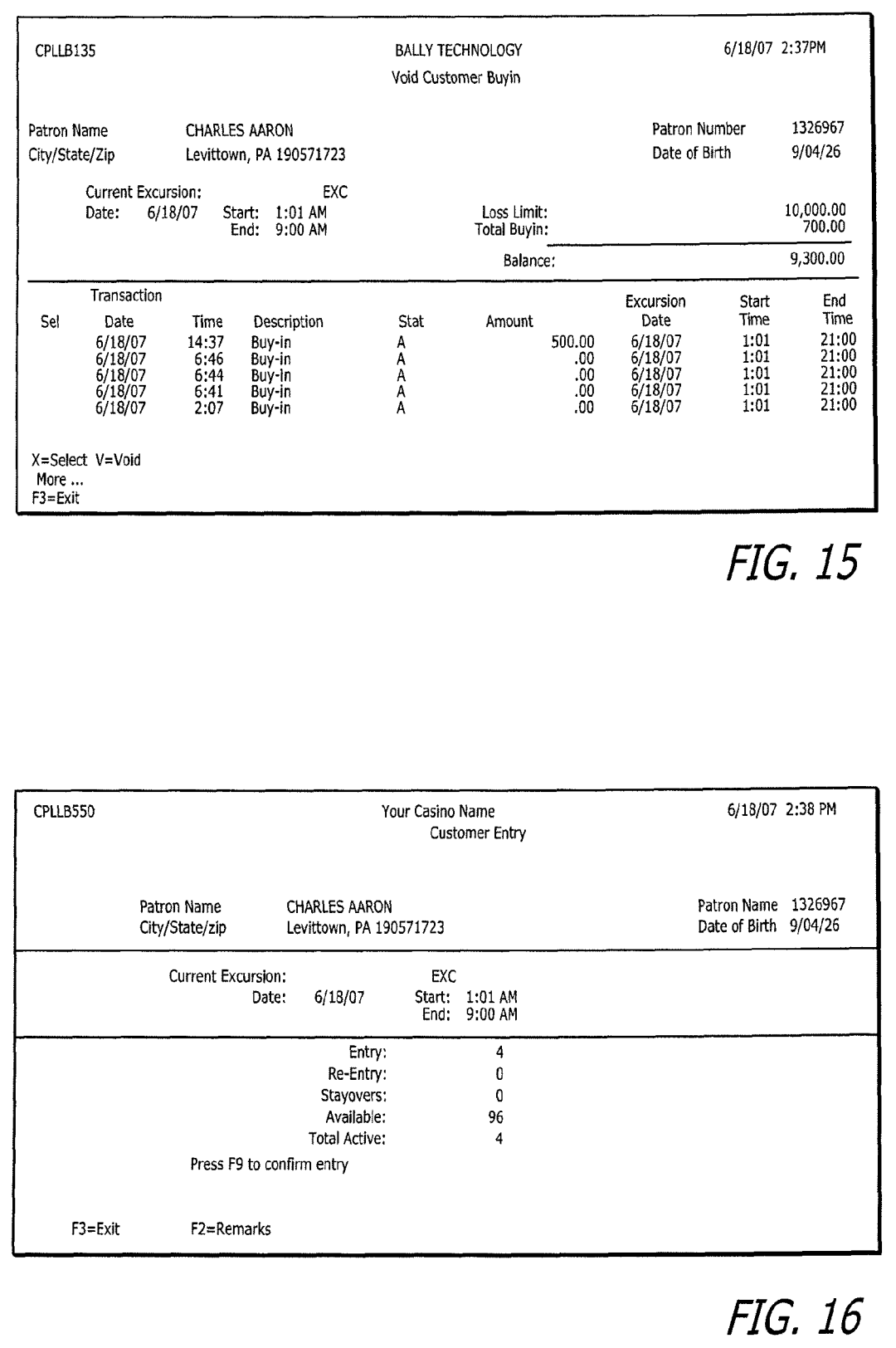

CPLLB135 BALLY TECHNOLOGY 6/18/07 2:37PM

Void Customer Buyin

Patron Name CHARLES AARON Patron Number 1326967

City/State/Zip Levittown, PA 190571723 Date of Birth 9/04/26

Current Excursion: EXC

Date: 6/18/07 Start: 1:01 AM Loss Limit: 10,000.00

End: 9:00 AM Total Buyin: 700.00

Balance: 9,300.00

| Sel | Transaction Date | Time | Description | Stat | Amount | Excursion Date | Start Time | End Time |
|---|---|---|---|---|---|---|---|---|
| | 6/18/07 | 14:37 | Buy-in | A | 500.00 | 6/18/07 | 1:01 | 21:00 |
| | 6/18/07 | 6:46 | Buy-in | A | .00 | 6/18/07 | 1:01 | 21:00 |
| | 6/18/07 | 6:44 | Buy-In | A | .00 | 6/18/07 | 1:01 | 21:00 |
| | 6/18/07 | 6:41 | Buy-in | A | .00 | 6/18/07 | 1:01 | 21:00 |
| | 6/18/07 | 2:07 | Buy-in | A | .00 | 6/18/07 | 1:01 | 21:00 |

X=Select V=Void

More ...

F3=Exit

FIG. 15

CPLLB550 Your Casino Name 6/18/07 2:38 PM

Customer Entry

Patron Name CHARLES AARON Patron Name 1326967

City/State/zip Levittown, PA 190571723 Date of Birth 9/04/26

Current Excursion: EXC

Date: 6/18/07 Start: 1:01 AM

End: 9:00 AM

| | |
|---|---|
| Entry: | 4 |
| Re-Entry: | 0 |
| Stayovers: | 0 |
| Available: | 96 |
| Total Active: | 4 |

Press F9 to confirm entry

F3=Exit F2=Remarks

FIG. 16

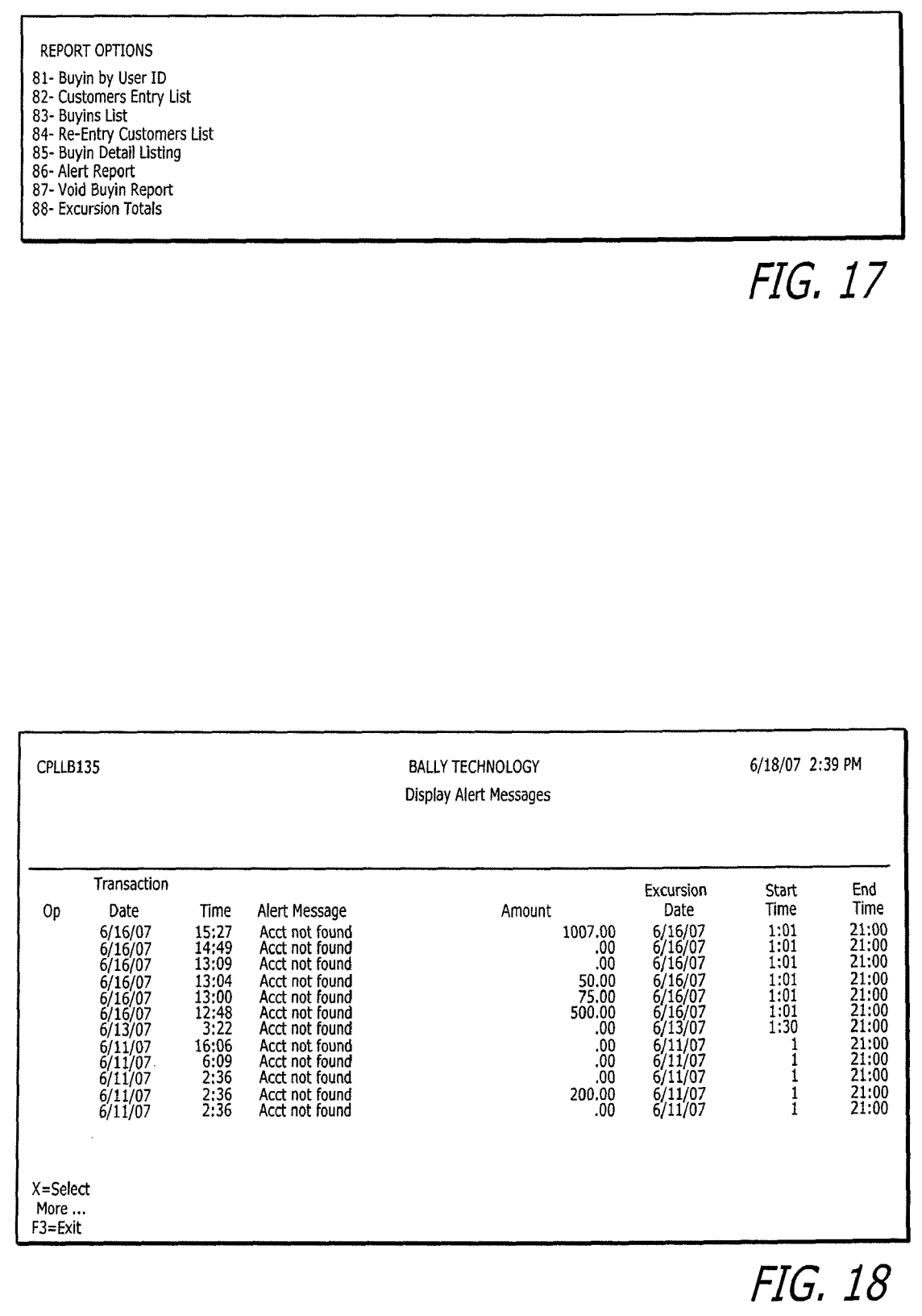

REPORT OPTIONS

81- Buyin by User ID
82- Customers Entry List
83- Buyins List
84- Re-Entry Customers List
85- Buyin Detail Listing
86- Alert Report
87- Void Buyin Report
88- Excursion Totals

FIG. 17

CPLLB135 BALLY TECHNOLOGY 6/18/07 2:39 PM

Display Alert Messages

| Op | Transaction Date | Time | Alert Message | Amount | Excursion Date | Start Time | End Time |
|---|---|---|---|---|---|---|---|
| | 6/16/07 | 15:27 | Acct not found | 1007.00 | 6/16/07 | 1:01 | 21:00 |
| | 6/16/07 | 14:49 | Acct not found | .00 | 6/16/07 | 1:01 | 21:00 |
| | 6/16/07 | 13:09 | Acct not found | .00 | 6/16/07 | 1:01 | 21:00 |
| | 6/16/07 | 13:04 | Acct not found | 50.00 | 6/16/07 | 1:01 | 21:00 |
| | 6/16/07 | 13:00 | Acct not found | 75.00 | 6/16/07 | 1:01 | 21:00 |
| | 6/16/07 | 12:48 | Acct not found | 500.00 | 6/16/07 | 1:01 | 21:00 |
| | 6/13/07 | 3:22 | Acct not found | .00 | 6/13/07 | 1:30 | 21:00 |
| | 6/11/07 | 16:06 | Acct not found | .00 | 6/11/07 | 1 | 21:00 |
| | 6/11/07 | 6:09 | Acct not found | .00 | 6/11/07 | 1 | 21:00 |
| | 6/11/07 | 2:36 | Acct not found | .00 | 6/11/07 | 1 | 21:00 |
| | 6/11/07 | 2:36 | Acct not found | 200.00 | 6/11/07 | 1 | 21:00 |
| | 6/11/07 | 2:36 | Acct not found | .00 | 6/11/07 | 1 | 21:00 |

X=Select
More ...
F3=Exit

FIG. 18

CPLLB140 BALLY TECHNOLGY 6/18/07 2:40 PM
Display Alerts Messages
Display Record

Patron Name ONE TST1 Patron Number 1604060
City/State/Zip Date of Birth 1/01/61

EXCURSION
Excursion:
Excursion Date: 5/30/07
Start Time: 8:00 End Time: 18:00
Alert Message: 5 Void okay crossed excursions
Amount: 100.00
Comments:
Transaction #: 16

Entered
User Init: QUSER
Transaction Date: 5/30/07
Time: 8:33
Workstation: QZDASOINIT F12=Cancel

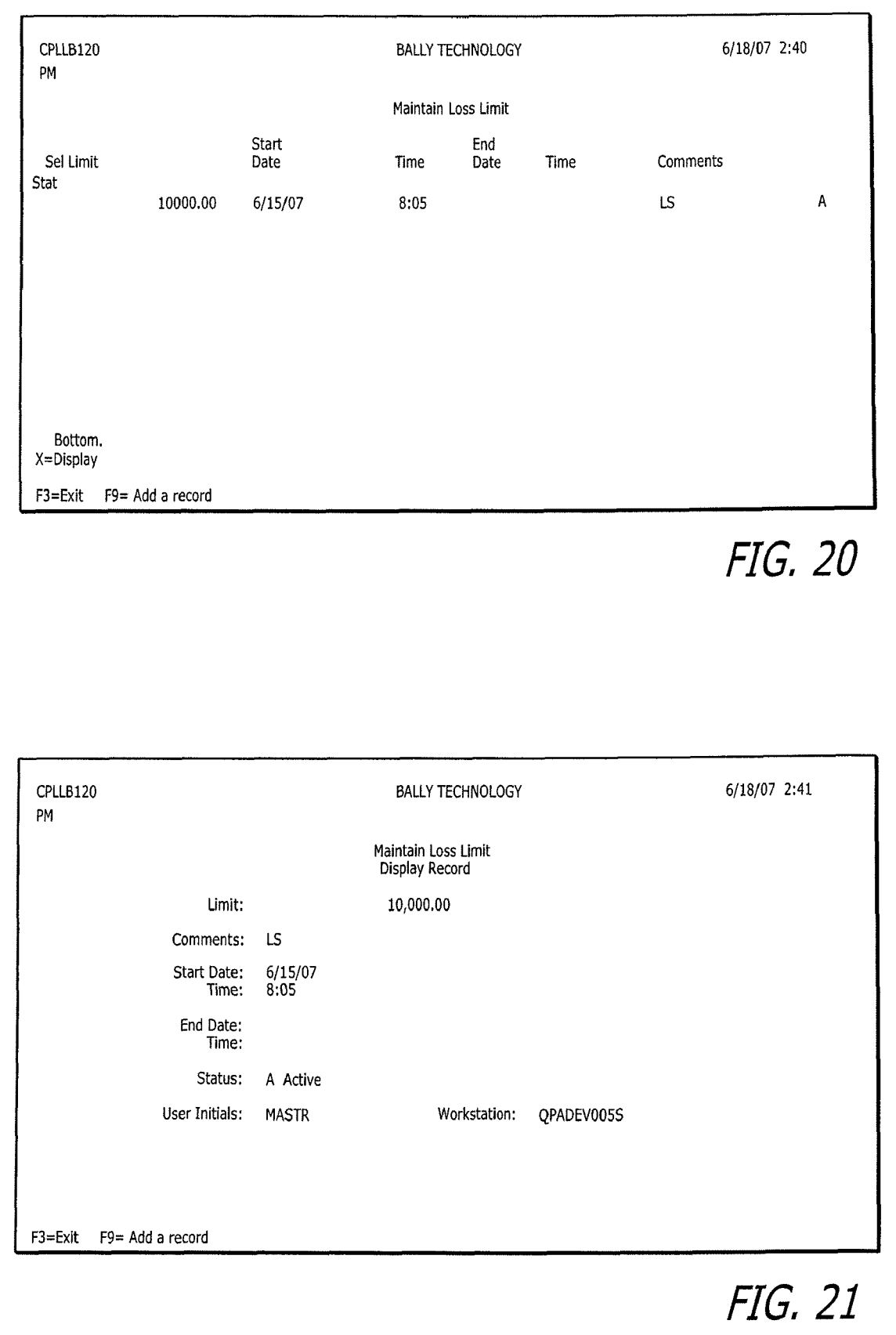

CPLLB120 BALLY TECHNOLOGY 6/18/07 2:40
PM

Maintain Loss Limit

| Sel Stat | Limit | Start Date | Time | End Date | Time | Comments | |
|---|---|---|---|---|---|---|---|
| | 10000.00 | 6/15/07 | 8:05 | | | LS | A |

Bottom.
X=Display

F3=Exit F9= Add a record

FIG. 20

CPLLB120 BALLY TECHNOLOGY 6/18/07 2:41
PM

Maintain Loss Limit
Display Record

Limit: 10,000.00

Comments: LS

Start Date: 6/15/07
Time: 8:05

End Date:
Time:

Status: A Active

User Initials: MASTR Workstation: QPADEV005S

F3=Exit F9= Add a record

FIG. 21

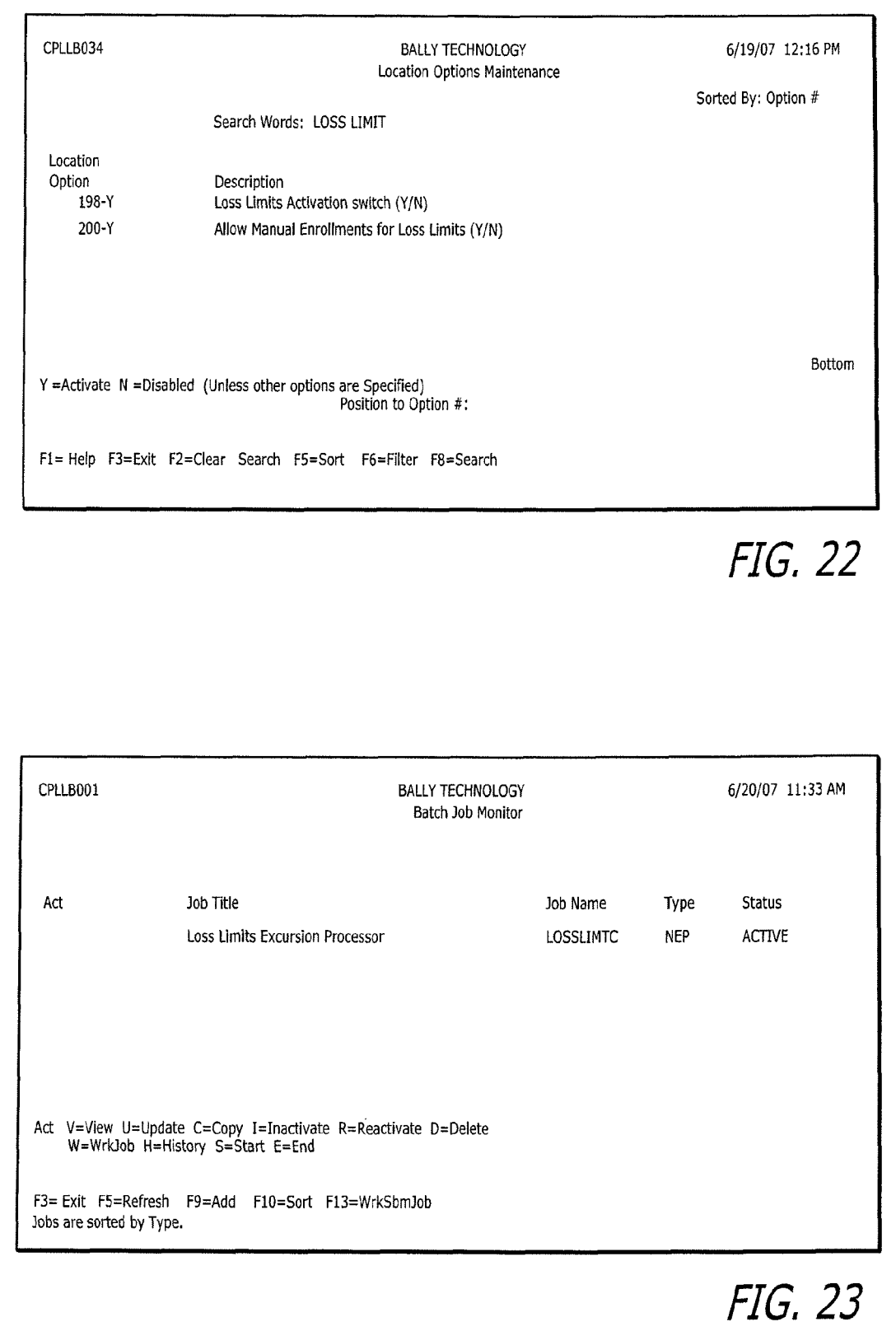

CPLLB034 BALLY TECHNOLOGY 6/19/07 12:16 PM

Location Options Maintenance

Sorted By: Option #

Search Words: LOSS LIMIT

| Location Option | Description |
|---|---|
| 198-Y | Loss Limits Activation switch (Y/N) |
| 200-Y | Allow Manual Enrollments for Loss Limits (Y/N) |

Bottom

Y =Activate N =Disabled (Unless other options are Specified)

Position to Option #:

F1= Help F3=Exit F2=Clear Search F5=Sort F6=Filter F8=Search

FIG. 22

CPLLB001 BALLY TECHNOLOGY 6/20/07 11:33 AM

Batch Job Monitor

| Act | Job Title | Job Name | Type | Status |
|---|---|---|---|---|
| | Loss Limits Excursion Processor | LOSSLIMTC | NEP | ACTIVE |

Act V=View U=Update C=Copy I=Inactivate R=Reactivate D=Delete
W=WrkJob H=History S=Start E=End F3= Exit F5=Refresh F9=Add F10=Sort F13=WrkSbmJob
Jobs are sorted by Type.

FIG. 23

METHOD FOR IMPLEMENTING LOSS LIMITS

CROSS-REFERENCE TO RELATED APPLICATIONS

This application is related to co-pending U.S. patent application Ser. No. 12/032,378 concurrently filed on Feb. 15, 2008, entitled SYSTEM FOR IMPLEMETING LOSS LIMITS. This application is related to U.S. patent application Ser. No. 11/938,251, filed Nov. 9, 2007, entitled RESPONSIBLE GAMING DEVICES, which is incorporated herein by reference. This application is also related to U.S. patent application Ser. No. 11/938,248, filed on Nov. 9, 2007, entitled RESPONSIBLE GAMING DEVICES AND RELATED METHODS, which is incorporated herein by reference. This application is a continuation-in-part of U.S. patent application Ser. No. 11/470,605, filed on Sep. 6, 2006, entitled SYSTEM GAMING, which claims the benefit of U.S. Provisional Application No. 60/714,754, filed Sep. 7, 2005, entitled SYSTEM GAMING APPARATUS AND METHOD, all of which are hereby incorporated by reference.

COPYRIGHT NOTICE

A portion of the disclosure of this patent document contains material that is subject to copyright protection. The copyright owner has no objection to the facsimile reproduction by any one of the patent document or the patent disclosure, as it appears in the Patent and Trademark Office patent files or records, but otherwise reserves all copyright rights whatsoever.

BACKGROUND

Gaming devices have been developed that have various features designed to capture and maintain player interest. For example, the mechanical reels of traditional gaming devices have been replaced with video depictions of spinning reels. These video gaming devices provide a richer gaming experience for players by including graphics or animation as part of the game. Moreover, gaming machines have been developed to provide a greater gaming experience with sound effects, animation, and the like.

In addition to providing a greater gaming experience, gaming devices provide added convenience to allow for longer gaming sessions. For example, multi-denomination gaming machines allow a player to select the wager denomination used in game play. Accordingly, a player does not need to change machines to play different wager denominations. Additionally, most gaming devices include bill and voucher acceptors that allow a player to easily initiate a game. That is, a player does not need to make changes to play a particular gaming machine. While these gaming device features both enhance the gaming experience and simplify the gaming experience, what is needed are gaming machines that also promote responsible gaming.

SUMMARY

Briefly, and in general terms, various gaming devices and gaming systems that promote gaming loss limits are disclosed herein. According to one embodiment, a loss limit system is associated with a gaming system, wherein the gaming system includes a central server, one or more gaming devices, and a network connecting the central server and the gaming devices. The loss limit system includes a player identification device, a monetary input device, a user interface, and a loss limit module. The player identification device is associated with a gaming device. The monetary input device is associated with the gaming device. The user interface is associated with the player identification device, the monetary input device, and the gaming device. The loss limit module is in communication with the player identification device, the monetary input device, the user interface, and the gaming device. Additionally, the loss limit module receives a player monetary loss limit, a time period, and a player identification. The loss limit module calculates an available funds amount from the monetary loss limit each time monetary funds are received during the time period at the gaming device via the monetary input device. The loss limit module deactivates the monetary input device when monetary funds are attempted to be entered that are greater than the available funds amount.

According to another embodiment, a method is disclosed for tracking players' buy-in activity and enforcing player loss limits within a casino, wherein the activity and loss limits are based on scheduled time sessions. The method includes: identifying a player at a gaming device; receiving a loss limit amount and an associated time session; accepting monetary funds for game play at a gaming device; calculating an available funds amount from the loss limit amount and the accepted monetary funds per the associated time session; and rejecting monetary funds for game play if the monetary funds value exceeds the available funds amount.

Other features and advantages will become apparent from the following detailed description, taken in conjunction with the accompanying drawings, which illustrate by way of example, the features of the various embodiments.

BRIEF DESCRIPTION OF THE DRAWINGS

FIG. 3 is an illustration of a screen that presents a loss limit menu;

FIG. 4 is an illustration of a screen that presents an option to display and update the session/excursion master;

FIG. 5 is an illustration of a screen that presents a detailed display of all fields in an excursion record;

FIG. 6 is an illustration of a screen that presents a history of an excursion showing dates and times this session took place;

FIG. 7 is an illustration of a screen that displays the current session running and the next session;

FIG. 8 is an illustration of a screen that presents a display of total active patron per session, new entries, re-enters, stay-overs;

FIG. 9 is an illustration of a screen that presents a swipe patron card option so the patron is entered into the session;

FIG. 10 is an illustration of a screen that presents a display of all patron transactions for all types shown;

FIG. 11 is an illustration of a screen that presents a detailed transaction for patrons;

FIG. 12 is an illustration of a screen that presents entering a manual buy-in for Loss Limit if needed;

FIG. 13 is an illustration of a screen that presents entering tokens purchased to be tracked against available limit;

FIG. 14 is an illustration of a screen that presents removing an asset patron linked to the system if in error;

FIG. 15 is an illustration of a screen that presents voiding a customer buy-in transaction with proper authority;

FIG. 16 is an illustration of a screen that presents entering a patron into a session manually;

FIG. 17 is an illustration of a screen that presents the listing of all reports in loss limit process;

FIG. 18 is an illustration of a screen that presents display alert messages;

FIG. 20 is an illustration of a screen that presents a control record for property limits;

FIG. 21 is an illustration of a screen that presents details of the property limits;

FIG. 22 is an illustration of a screen that presents location options for a never ending job to run, and the ability to enter enrollments manually;

FIG. 23 is an illustration of a screen that presents a batch job monitor for an active loss limit job;

FIG. 24 is an illustration of a screen that presents a table view in which a card swipe is used to check enrollment and key cash buy-in;

FIG. 26 is an illustration of a screen that presents a successful rating start and approval of a buy-in;

FIG. 29 is an illustration of a screen that presents a request to open rating and a protected cash buy-in;

FIG. 36 is an illustration of a screen that presents a "no rating" buy-in;

DETAILED DESCRIPTION

Various embodiments are directed to a loss limit system and method. One embodiment of a loss limit system and method restricts players from losing (i.e., spending) more than a specified amount of money and/or currency at a casino's gaming devices (e.g., slot machines, table game, other non-slot gaming machine, racing or sport event gaming device, and the like) within a specified gaming session and/or time period. In one embodiment, this loss limit monitoring and management is performed by controlling acceptance of currency at a gaming machine's bill validator. Specifically, in this embodiment the loss limit system disables specific bill denominations on the bill validator. Additionally, the loss limit system has the ability to restrict the amount of money that a player can spend within a gaming session (or time period) at slot machines and/or other gaming devices. Notably, the loss limit system does not require a player tracking card that carries data (encoded on the card) regarding the amount of money that the player has spent and/or received, which would require both a card reader and a card writer to update the player's account values as the player places wagers. In other embodiments, other techniques are utilized for identifying a player instead of a player tracking card and card reader. These other techniques include, by way of example only, and not by way of limitation, player identification numbers and/or player passwords, biometric identification systems, and the like.

Figure 1:
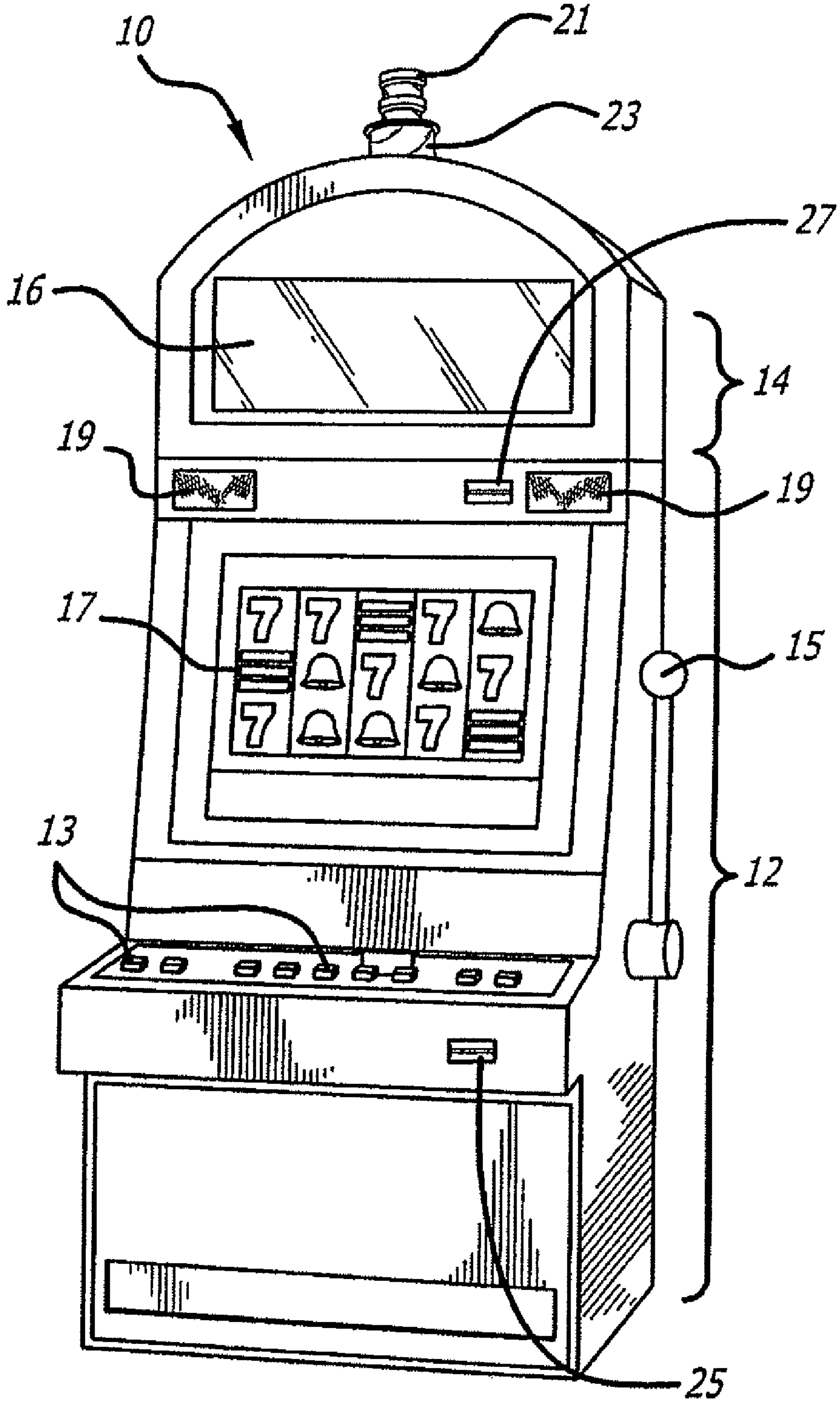
FIG. 1 is a perspective view of one embodiment of a responsible gaming device.
Figure 2:
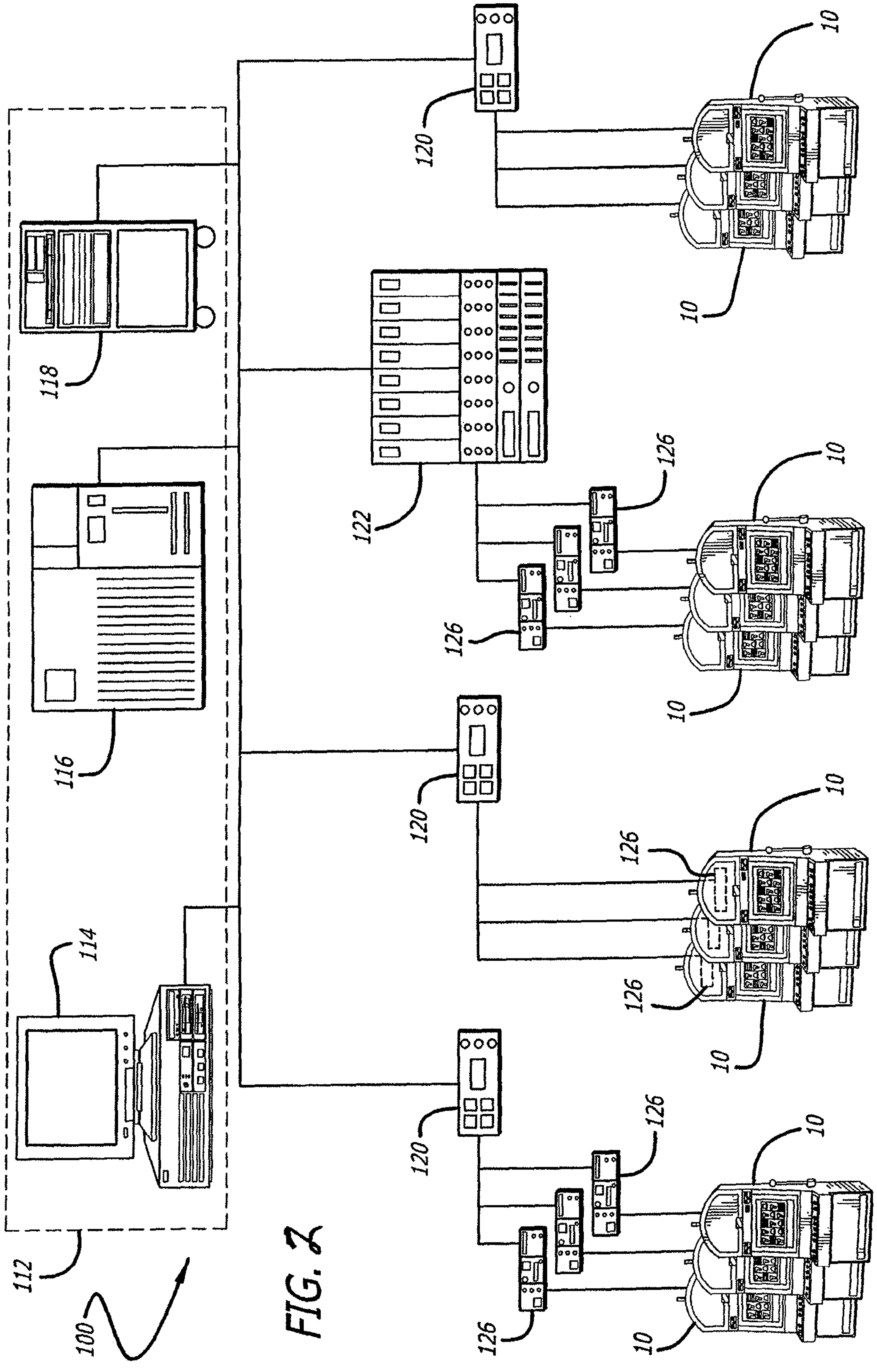
FIG. 2 is a diagram of one embodiment of a gaming system including one or more responsible gaming machines.

Referring now to the drawings, wherein like reference numerals denote like or corresponding parts throughout the drawings and, more particularly to FIGS. 1-2, there are shown various embodiments of a loss limit system. More specifically, as shown in FIG. 1, the gaming device 10 includes a main cabinet 12 and a top box 14. The gaming device 10 also includes a main display 17 that presents one or more games and various player input devices 13, to play the games.

The main cabinet 14 of the gaming device 10 houses a game monitoring unit (not shown) that includes a CPU, circuitry, and software for receiving signals from the player-activated buttons 13 and a handle 15, operating the games, and transmitting signals to the respective game display 17 and speakers 19. The game monitoring unit is a device that is connected to the circuitry of the gaming device 10 that monitors the game, coin status, player winnings, and other functions of the gaming device 10. The game monitoring unit also sends the monitored information to a backend server for processing. In various embodiments, the game program may be stored in a memory (not shown) comprising a read only memory (ROM), volatile or non-volatile random access memory (RAM), a hard drive or flash memory device, or any of several alternative types of single or multiple memory devices or structures.

In one embodiment of a loss limit system 20, several parameters are typically utilized. These include, by way of example only, and not by way of limitation, (1) a property-current-session-loss-limit, which is defined as a predefined amount of money that a player can spend within a gaming session, (2) a player-current-cash-limit, which is defined as the amount of money that the player has already spent with in a gaming session, and (3) player-monies-available, which is defined as the amount of monies the player can still spend within the gaming session.

In one embodiment, the loss limit system 20 enables the restriction of the amount of money that a casino player can spend at a gaming device 10 (e.g., a slot machine, table game, other non-slot gaming machine, racing or sport event gaming device, and the like) within a gaming session using a central server 30 and player tracking cards. In this regard, a central server 30 may be used to keep track of all currency/monies that each player has spent within a casino's gaming session.

In other embodiments, techniques other than player tracking cards and card readers are utilized (e.g., player identification numbers and/or player passwords, biometric identification systems, and the like).

In some embodiments of the loss limit system 20, a SMS (slot management system) NT Code on a Controller Board (NT Board) is utilized within a gaming device 10 to deactivate the bill validator 40 from accepting currency (e.g., tickets that are available for acceptance as monetary legal tender) while there is not an active player card inserted into the card reader of the gaming device 10. In such an embodiment, the NT code only activates the bill validator 40 to accept currency after a player card has been inserted into the card reader of the gaming device 10, and the loss limit system 20 receives a transaction from the central server 30 indicating the property-current-session-loss-limit, the player-current-cash-limit, and the player's ID. The loss limit system 20 uses this information to compute the amount of player-monies-available for this player to spend (i.e., the property-current-session-loss-limit minus the player-current-cash-limit). If the player-monies-available is less than the smallest bill denomination accepted by the bill validator 40, no bill acceptance command is sent to the bill validator 40, otherwise the NT code transmits to the bill validator 40 where bills are allowed to be accepted, to ensure the player does not exceed the property-current session-loss-limit.

Each time a bill is accepted via the bill validator 40 the NT code (or equivalent program) re-computes the player-monies-available, and only reactivates the bill denominations that will not allow the player to exceed the property-current-session-loss-limit. This transaction is forwarded to the central server 30 to update the player-current-cash limit, which contains at least the amount of the bill accepted and the player ID. When a new gaming session is activated, the central server 30 informs the SMS system of this information, which resets the player-current-cash-limit back to zero. When the player card is removed from the card reader of the gaming device 10, the NT code (or equivalent program) deactivates the bill validator 40 from accepting currency (e.g., tickets that are available for acceptance as monetary legal tender).

In one embodiment, if the gaming device protocol or the bill validator 40 protocol does not support the ability to disable specific bill denominations, the NT code (or equivalent program) will disable the bill validator 40 if the player-monies-available is less than the largest bill accepted by the bill validator. Furthermore, some embodiments may require a wiring harness.

In some embodiments of the loss limit system 20, new transaction functions are implemented by the system during a gaming session. One such transaction is a player loss limit transaction (transaction 233 in one embodiment). This transaction is sent in response to a card in transaction (e.g., when a change occurs with the limit amount on the AS/400 level). This transaction contains: (1) property-current-session-loss-limit and (2) player current cash amount. Another transaction is a bill accepted transaction (transaction 236 in one embodiment). This transaction is sent whenever a bill is accepted. This transaction contains the amount of the bill accepted. See the chart below regarding transaction ID information:

| Transaction Information at Slot and NT | | |
|---|---|---|
| SFPTR Transaction | | |
| STATION ID | | |
| TRANSACTION ID | 233 | 236 |
| ASSET NUMBER | | |
| ACCOUNT NUMBER | | |
| LOSS LIMIT CENTS | | |
| PATRON LIMIT CENTS | | |
| AMOUNT OF BILL ACCEPTED SLOT MACHINE | | |

A 233 transaction is from the iSERIES to NT at the gaming machine. This notifies the balance available to patron. The gaming machine keeps track of the balance after the 233 is received, transactions are updated on the iSeries at the same time, however a current balance is kept both on gaming machine and the iSERIES. The transaction ID 236 (bill accepted) is received on the iSERIES from the gaming machine. A transaction number 998 is sent from the iSeries to the SMS (slot accounting system) to identify the roll to another session. This transaction causes the iSERIES never ending job program to broadcast a 233 transaction to all gaming machines with active cards in. This will notify players that the loss limit has been reset to the property value for the new session.

In one embodiment of the loss limit system 20 that supports the SAS (slot accounting system) protocol, bill acceptance is based off of the SAS bill meter changes. The total amount left will be recalculated, and a new SAS Long Poll Command 08 (Configure Bill Denominations) will be sent to the game MPU. This command tells the game MPU to enable all bill denominations available and to disable the bill validator 40 after each accepted bill. In one particular embodiment, after receiving the command, the NT Controller Board code displays a message, for example "CURRENT BILL LIMIT" on the top line and $XXX.XX (total bill amount left) on the second line for 5 seconds. In one embodiment, if the recalculated value is zero then the SAS Long Poll Command 08 (Configure Bill Denominations) is sent to disable all bills, "CURRENT BILL LIMIT" is displayed on the top line, and "HAS BEEN REACHED" is displayed on the second line for 5 seconds. Additionally, if the amount left is less than a particular bill denomination then that bill denomination will be disabled.

In another embodiment of the loss limit system 20 that does not support SAS Protocol, the NT Controller Board code uses the bill validator lockout board to disable the bill validator 40. The code will not enable the bill validator control output during this condition. In such an embodiment, when a player inserts their card, the loss limit system 20 sends down a 233 transaction that contains the property's loss limit and the players current cash amount. Bill acceptance will be based off of event information from the game MPU. The total amount left will be recalculated and if the amount is below the highest available acceptable denomination on the floor. In this situation, the bill of the loss limit system 20 will not be enabled, "CURRENT BILL LIMIT" is displayed on the top line and "HAS BEEN REACHED" is displayed on the second line for 5 seconds. After each bill acceptance a 236 transaction (bill accepted) is sent to the loss limit system 20.

At this stage, error reporting occurs, if necessary. Specifically, in one embodiment, if the game MPU fails to respond or responds with a No ACK (e.g., no acknowledgement) message to the SAS Long Poll Command 08 (Configure Bill Denominations) at start up or upon recovery from a communication error, then the NT Controller Board code reports a bill validator Command No ACK message to the system. In one particular embodiment, this is a transaction 9 subcode 16 command. In some embodiments, new transactions are utilized to support the loss limit system 20.

In one embodiment that incorporates an iSERIES system (iSERIES to NT), when the Loss-Limits feature is active, the iSERIES responds to each inserted player card with a specific transaction ID (e.g., transaction ID 233). In this particular transaction ID, the field Loss-Limit-Cents is the total amount of monies the player is allowed to use in cents, and the field Player-Limit-Cents is the amount of monies the player has already used in cents. In one embodiment, this transaction is asset and account number specific. Basically, the player can not insert bills which, when added to their Player-Limit-Cents, would exceed the Loss-Limit-Cents.

| DESCRIPTION | | NAME | ATR | LEN | STARTS | ENDS |
|---|---|---|---|---|---|---|
| STATION ID | BINARY | STAD233D A | A | 1 | 1 | 1 |
| TRANSACTION ID | BINARY | TRID233D A | A | 1 | 2 | 2 |
| ASSET NUMBER | BINARY | AST233D A | A | 2 | 3 | 4 |
| ACCOUNT NUMBER | ASCII | CRN0233D A | A | 9 | 5 | 13 |
| LOSS LIMIT CENTS | BINARY | PLSL233D A | A | 8 | 14 | 21 |
| PLAYER LIMIT CENTS | BINARY | PLTL233D A | A | 8 | 22 | 29 |

In another embodiment that incorporates an iSERIES system (NT to iSERIES/via GameNet and GameNet-Server), whenever a bill is accepted at the bill validator 40, the NT code adds the amount of the bill to the Player-Limit-Cents, ensuring that the player does not exceed the Loss-Limit-Cents. A transaction (236 Bill Accepted transaction) is also sent that contains all existing meter and card data fields, as well as the bill amount in cents as an eight-byte hex field. In Standard formats this eight byte field must be added to the existing data packet stating in position 184 (offset from one). In one embodiment, Big Meter formats to the eight byte field must be inserted into the spare data field stating in position 805. If the player card-data fields are to also be sent, this must occur after the eight byte field.

In one embodiment of a loss limit system 20, a player card is used for player identification. Additionally, other forms of identification include, by way of example only, and not by way of limitation, a driver's license, credit cards, smart cards, biometrics, and proximity sensing. Moreover, different areas of the country may have differing regulatory requirements. For example, some states' regulatory requirements may require that all players are required to present a driver's license when receiving a patron card. The player card may be required upon entry at the casino for all patrons. In some embodiments, the number of entries, stay-overs, and re-entries are calculated for each session.

In another aspect of a loss limit system 20, gaming devices 10 include, by way of example only, and not by way of limitation, slot machines, non-slot gaming machines, table games (manual or electronic) with automated rating platform or manual buy-in entry, wireless devices, internet gaming with Web Portal, iView-type devices, and other machines or other processes set up within a management system for play at kiosk or other devices such as keno, poker, racing, and sporting events.

In still another embodiment of a loss limit system 20, security is provided through the use of a player card and a pin number for a patron. Other types of identification may also be utilized instead of, or in addition to a player card and pin number. Other security techniques include user profiles or login and a password for clients. Additionally, another secondary level of identification that can be utilized is authorization and a password for a specific application. Still other forms of identification for employees may include a security card that stores an authorization and code for security level and biometrics.

In yet another embodiment of a loss limit system 20, the gaming date is the time of start and end of the gaming day. For most casino operations or resorts this is not normally the same as a calendar day since the change at midnight is normally a busy time in this world. An adjustable gaming date parameter enables an establishment to start a day at 3:00 a.m. and end at 2:59 a.m. the next day. This will control when sessions start for a day. Additionally, this parameter of a loss limit system enables different days of weeks to have different sessions time.

As described above, a preferred embodiment of the loss limit system 20 restricts and/or limits the amount of money that a casino patron can spend in currency at a gaming device 10 during a session. In one embodiment, a central server 30 keeps track of all Cash Buy-in that each patron has spent within the Session and limit. The loss limit system 20 enables a casino to set up excursions (sessions) for a set time frame during a day along with the ability to set an allowable dollar amount per excursion as a loss limit. In one specific, non-limiting embodiment, the loss limit system 20 does not allow a patron to enter the gaming area or play unless they have had their player card swiped for entry. In this embodiment, there is no patron game play without being entered in the excursion. All play is tracked along with cash purchases of tokens during the excursion time frame. When an excursion is complete, there is an auto-rollover process that enables play for players that have been stopped.

In one embodiment of the loss limit system 20, the NT code is in place to track play and lock play from other locations when a gaming machine is active with a card. With the newer bill validators, specific bills that are accepted into a gaming machine can be restricted. The loss limit system 20 identifies that a patron has spent $495.00 of a $500.00 limit and the acceptor does not accept any bill over $5.00. In another embodiment of the loss limit system 20, older bill validators, if still in use, can only be shut down based on the highest denomination they accept. In this situation, if the largest bill that a bill acceptor will accept is $100.00, this machine would shut play down when a patron spends 401.00.

In one embodiment of the loss limit system 20, the limit is set up by property per session. Other forms can be set up for a group or corporate limit that would set a limit for player within the corporation per player or a limit per player per session, day, trip or another timeframe per player's request. The loss limit system 20 provides a real-time tracking of buy-in and lock out when a patron has reached the loss limit cap per session or excursion.

In one example of the loss limit system 20 in use, a player begins play at a gaming machine A. The player inserts a card at gaming machine A and then inserts cash or tokens. The player removes the card and inserts it in another machine. This would then give you the current balance at gaming machine B. So if the balance at gaming machine A showed a $500.00 available limit and a $100 bill was inserted in gaming machine A, then gaming machine B would have a $400.00 balance. If $200.00 is entered in gaming machine B, the customer then has $200.00 available. If a player then goes to the gaming booth or table games, he can only get $200.00 dollars in tokens or play $200.00 in table buy-in until the next session starts. If all money is lost in the first hour of a 2 hour session, the player will not be able to play again for an hour. When all systems are communicating properly, the system will advise the player when the value is available again at rollover.

One embodiment of the loss limit system 20 includes various different loss limit related functions. There are display functions to present excursion totals. Other options include swiping a patron in an excursion. In some jurisdictions, a player is not allowed into the operational game area without a player card. In one embodiment, options are then available to track player transactions, enter a buy-in, enter gaming tokens purchased, remove a link from an asset in case a transaction incorrectly locks the player card, and/or voids an invalid buy-in or manual entry. In another embodiment, reports are available to see a buy-in by user ID, a customer entry list, a buy-in list, a buy-in detail listing, an alert report, a void buy-in, and excursion totals. In still other embodiments, maintenance options enable display alerts, maintain the property limit, and maintain controls for user menu options.

In one embodiment of the loss limit system 20, all active players receive a message at rollover at their display or iView (or other system gaming/player tracking user interface) showing that the loss limit has been increased to 'X' dollars based on a new session. In one specific, non-limiting embodiment of the loss limit system 20, players are not allowed in a session without a player card, and a driver's license or other approved form of identification must be provided to receive a card. No one in a loss limit environment is unidentified.

In another embodiment of the loss limit system 20, TableView and other auto table games rating systems can be used with this process. The other rating systems need to follow interface criteria for this process. Along with automated systems, all ratings entered in an open status within the ACSC CMS system may be tracked in the total loss limit per session. All ratings start with a patron/players being entered in a session or validated and that they have been enrolled and they have cash available for loss limit. If a patron plays with chip buy-in they still must be enrolled in the session. A player will not be able to play at a table game or another gaming device 10 if someone is playing at the gaming machine device with that card. Gaming machines will keep the device locked until the card is pulled out.

Referring now to FIG. 3, an illustration of a screen that presents a loss limit menu is shown. Specifically, this is an all menu options for a loss limit system 20. FIG. 4 is an illustration of a screen that presents an option to display and update the session/excursion master. Specifically, FIG. 4 displays an update of the excursion master screen showing the name of excursion or session, active days of week, and start and end time. Referring now to FIG. 5, an illustration of a screen that presents a detailed display of all fields in an excursion record is shown. Specifically, FIG. 5 displays an update excursion master showing all details of the session and enables changes or inactivation of the session.

Referring now to FIG. 6, an illustration of a screen that presents a history of an excursion showing dates and times this session took place in shown. FIG. 7 is an illustration of a screen that displays the current session running and next session. Option 2 from the menu allows you to display the current and next excursion. FIG. 8 is an illustration of a screen that presents a display of total active patrona per session, new entries, re-enters, stay-overs. Option 3 displays the excursions. In the embodiment shown in FIG. 8, an Entry is a player first in for the day for that session or a Stay-over from the prior gaming date. All players will be newly enrolled if they are staying over from gaming day one to gaming day two. A Re-Entry is a patron that leaves the casino operation in a gaming day and returns within the same gaming day. A Stay-over is any patron that was active at the time of rollover and continues to play with their new limit that increased at roll-over to the new session. Total Active is the number of players in each session. The Total Active should equal the total of Entries (new patrons enrolled)+Re-entries (patrons leaving the gaming area for anytime during the gaming date and returning)+Stayovers (patrons staying active from one session to another). Each player on the gaming floor should be counted in one section per session to be part of the Total Active.

Referring now to FIG. 9, an illustration of a screen that presents a swipe patron card option so the patron is entered into the session is shown. Specifically, FIG. 9 presents Option 50, which enables patron's cards to be used to enter them into the gaming operation via a card swipe. Continuing, FIG. 10 is an illustration of a screen that presents a display of all patron transactions for all types shown. Specifically, FIG. 10 presents Option 51, which displays all patron transactions including enrollment, buy-in rollover, and re-entries. These transactions are stored in file CFPBTLL and Descriptions come from field TRTPBTL with values shown as below. FIG. 11 is an illustration of a screen that presents a detailed transaction for patrons. Specifically, FIG. 11 presents a detailed transaction of Option 51 of FIG. 10.

Referring now to FIG. 12, an illustration of a screen that presents entering a manual buy-in for Loss Limit if needed is shown. Specifically, FIG. 12 presents Option 52, which allows entering a manual buy-in for a loss limit. Continuing, FIG. 13 is an illustration of a screen that presents entering tokens purchased to be tracked against available limit. Specifically, FIG. 13 presents Option 52, which enables entering tokens purchased that will be tracked to the limit and session. FIG. 14 is an illustration of a screen that presents removing an asset patron linked to the system if in error. Specifically, FIG. 14 presents Option 55, which enables removing an asset link. If an asset is not unlocked properly, a patron will not be able to continue play. This Option allows the possible error to be corrected.

Figure 19:
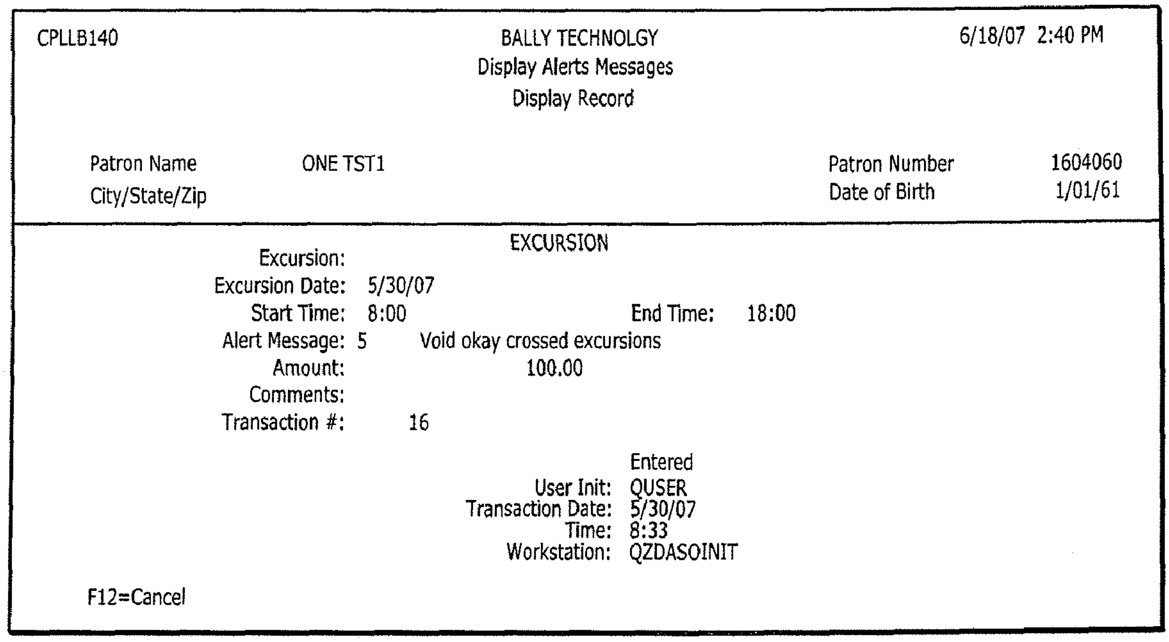
FIG. 19 is an illustration of a screen that presents the details of an individual alert.

Referring now to FIG. 15, an illustration of a screen that presents voiding a customer buy-in transaction when proper authority is shown. Specifically, FIG. 15 presents Option 56, which allows voiding a patron buy-in with the appropriate authority. Continuing, FIG. 16 is an illustration of a screen that presents entering a patron into a session manually. Specifically, FIG. 16 presents Option 60, which allows entering a patron into a session manually. FIG. 17 is an illustration of a screen that presents the listing of all reports in the loss limit process. Specifically, FIG. 17 displays reports that track transactions for Loss Limit or Responsible Gaming. Continuing, FIG. 18 is an illustration of a screen that presents display alert messages. Specifically, FIG. 18 presents Option 91, which displays alerts of all possible patron errors that may need correction. FIG. 19 is an illustration of a screen that presents the details of an individual alert. Specifically, FIG. 19 shows more detail from the alert in Option 91 above.

Referring now to FIG. 20, an illustration of a screen that presents a control record for property limits is shown. Specifically, FIG. 20 presents the maintain property limit screen that allows additions or changes to the limit as needed. Continuing, FIG. 21 is an illustration of a screen that presents details of the property limits. Specifically, FIG. 21 presents detail of Option 97 of the loss limit maintenance described above. FIG. 22 is an illustration of a screen that presents location options for a never ending job to run and the ability to enter enrollments manually. Property options must be set to 'Y' for Loss Limit process to be active. Continuing, FIG. 23 is an illustration of a screen that presents a batch job monitor for an active loss limit job. Specifically, FIG. 23 presents a loss limit processor job.

Figure 24:
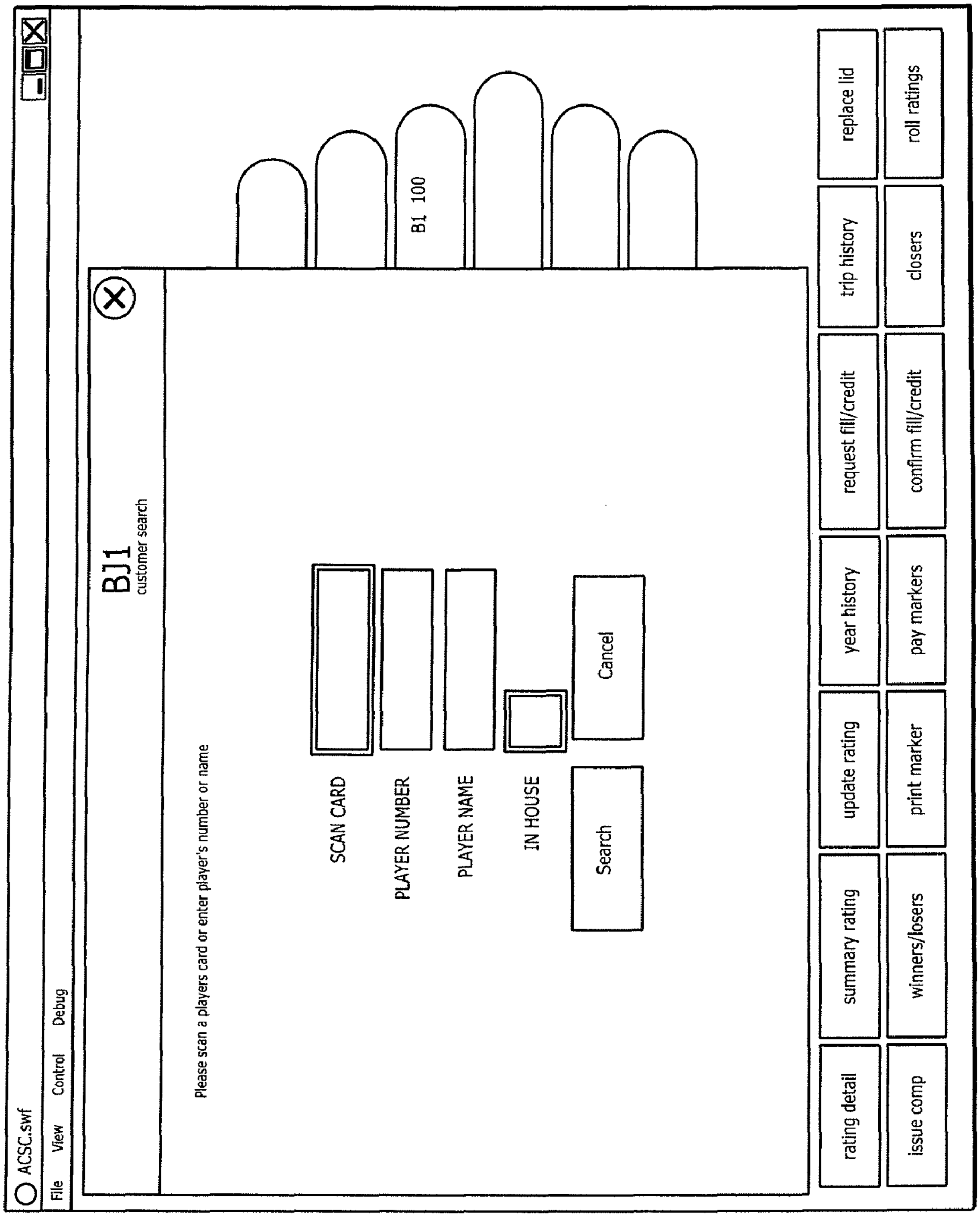

Referring now to FIG. 24, an illustration of a screen that presents a table view in which a card swipe is used to check enrollment and the key cash buy-in is shown. Specifically, FIG. 24 presents a screen for the swiping of the card to check enrollment. The first step in a loss limit method is to check for enrollment of a player in the current excursion. If the player is not enrolled, a popup error message is presented stating the error. If the player is enrolled, the player may continue on to the cash buy-in screen. Current loss limit information is retrieved in real time. The New Rating option is selected by default. "Time" is populated with the current terminal clock time and can not be changed. "Issued By" is populated with the user who is logged in which can be changed.

Figure 25:
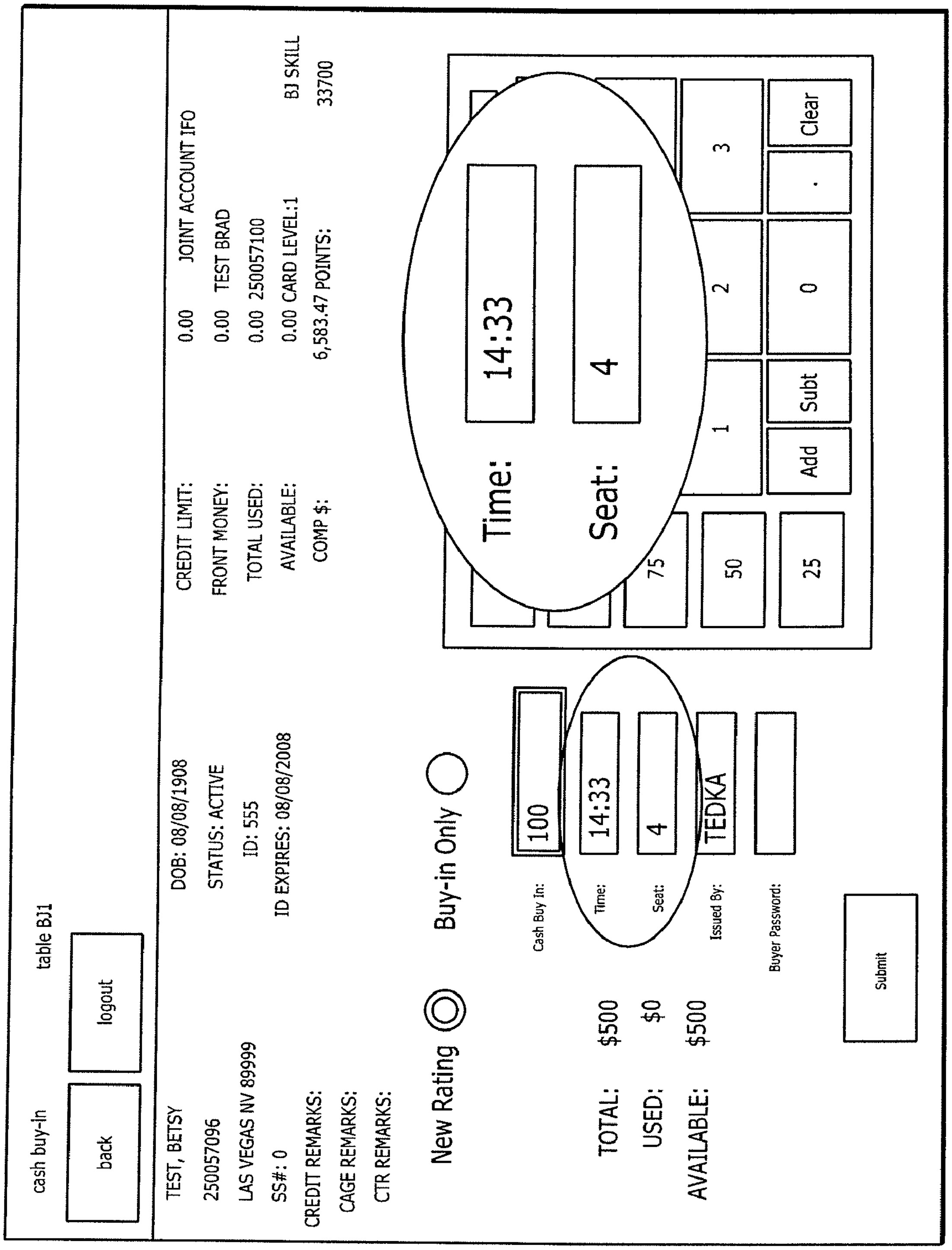
FIG. 25 is an illustration of a screen that presents an assigned seat number in a table view.

Referring now to FIG. 25, an illustration of a screen that presents an assigned seat number in a table view is shown. To begin the gaming process using the loss limit system 20, the seat will be blank. The user is required to enter a seat number for a New Rating. If the seat number is not valid or is already occupied, an error message will be displayed. The player then enters the cash buy-in amount and issuer password. When submit is clicked, the patron's loss limit enrollment and available balance is rechecked in real time. If the buy-in amount is more than the player has available or for any other reason the cash buy-in is not valid, an error message will be displayed. To open a new rating, a request as such is sent. If a player receives a loss limit or any other error during the submission process, the player remains on the Cash Buy-in screen and the Loss Limit information is updated. The player is allowed to fix the error and resubmit.

Figure 26:
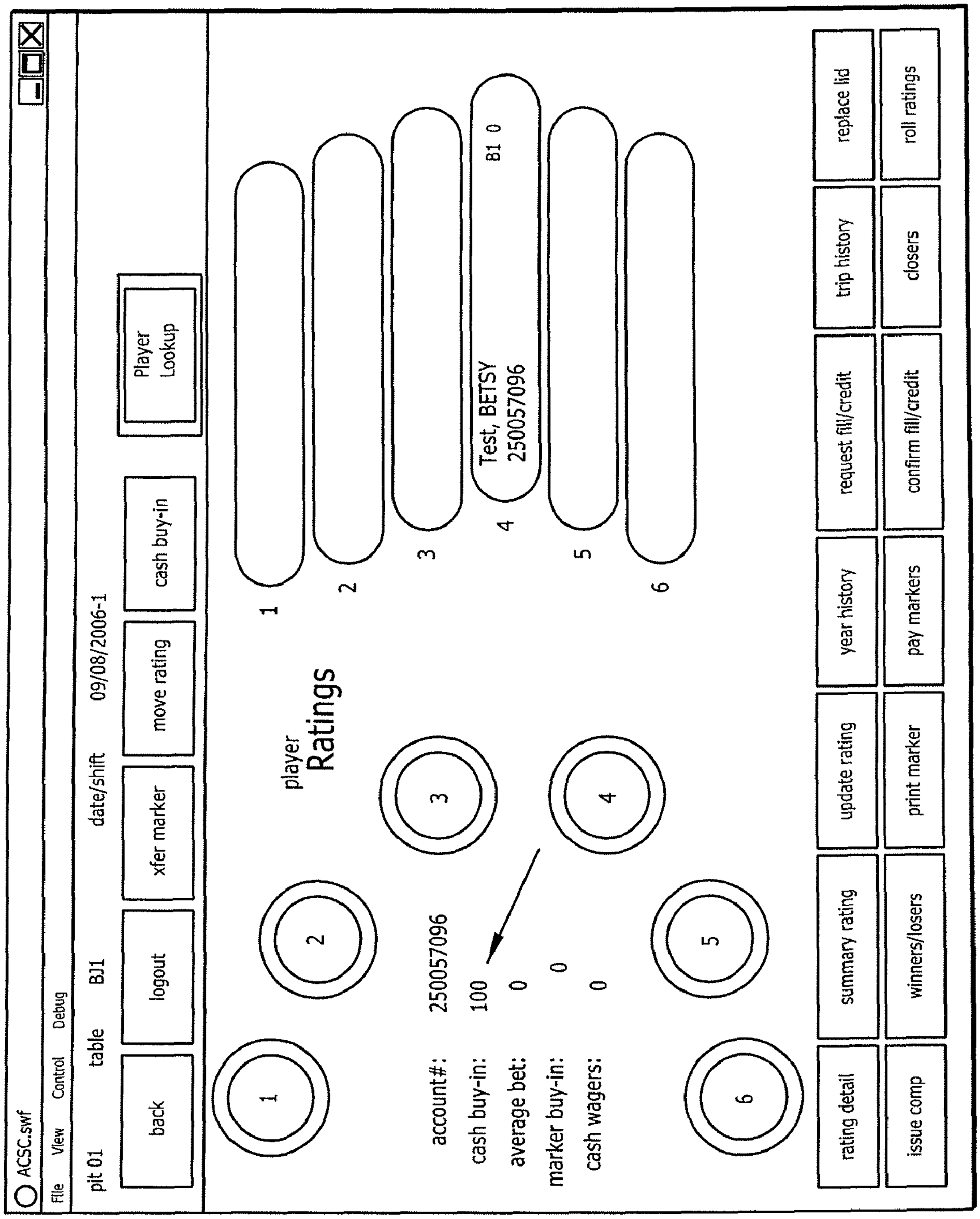
Figure 27:
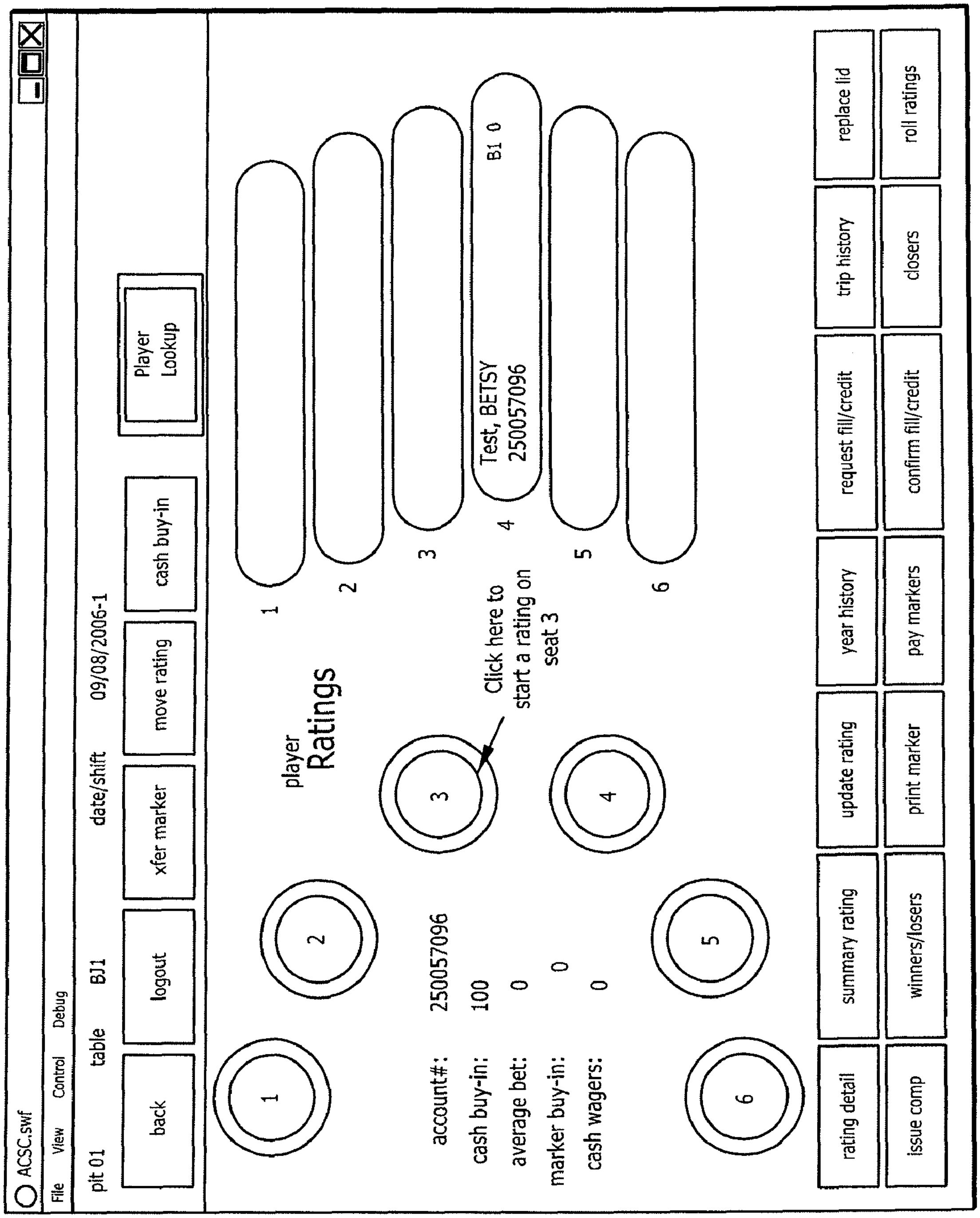
FIG. 27 is an illustration of a screen that presents a rating started with chips.
Figure 28:
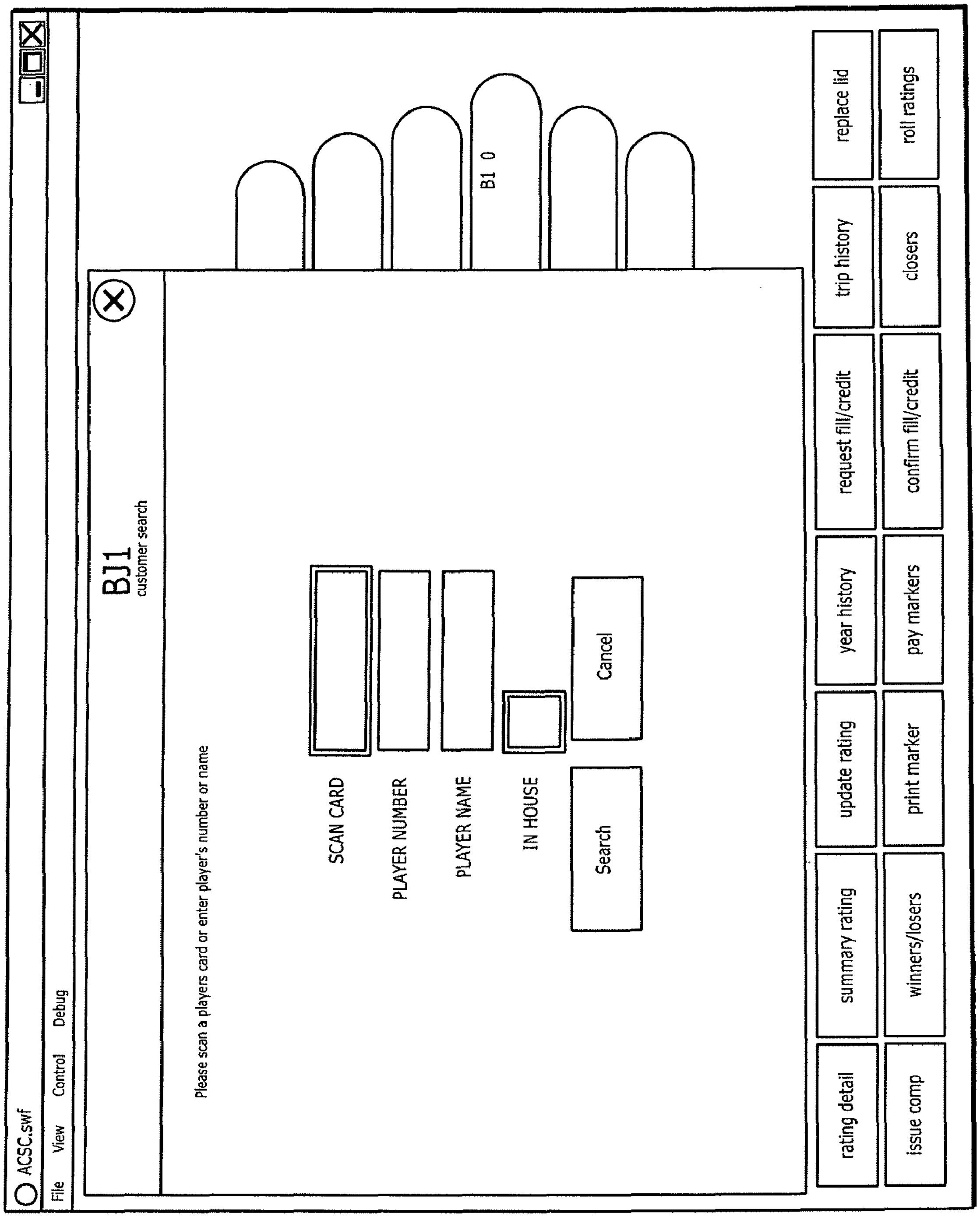
FIG. 28 is an illustration of a screen that presents an enrollment in session checked.

Referring now to FIG. 26, an illustration of a screen that presents a successful rating start and approval of a buy-in is shown. Specifically, FIG. 26 presents a successful cash buy-in transaction, which directs a player back to the table detail screen where the player sees that the new rating was also started at the appropriate seat. The cash buy-in is reflected in the new open rating. Continuing, FIG. 27 is an illustration of a screen that presents a rating that is started with chips. Typically, starting a rating with chips-in is not part of the loss limit buy-in process, but it still must be enrolled in the session. Selecting an empty seat starts a rating with no cash buy-in. FIG. 28 is an illustration of a screen that presents an enrollment in session checked by swiping the card. As described above, the first step of a loss limit method is to check for enrollment in the current excursion. If the player is not enrolled, a popup error message is presented stating the error. When it is determined that the player is not enrolled, play cannot continue with chips. If the player is enrolled, the player may continue on to the cash buy-in screen.

Figure 29:
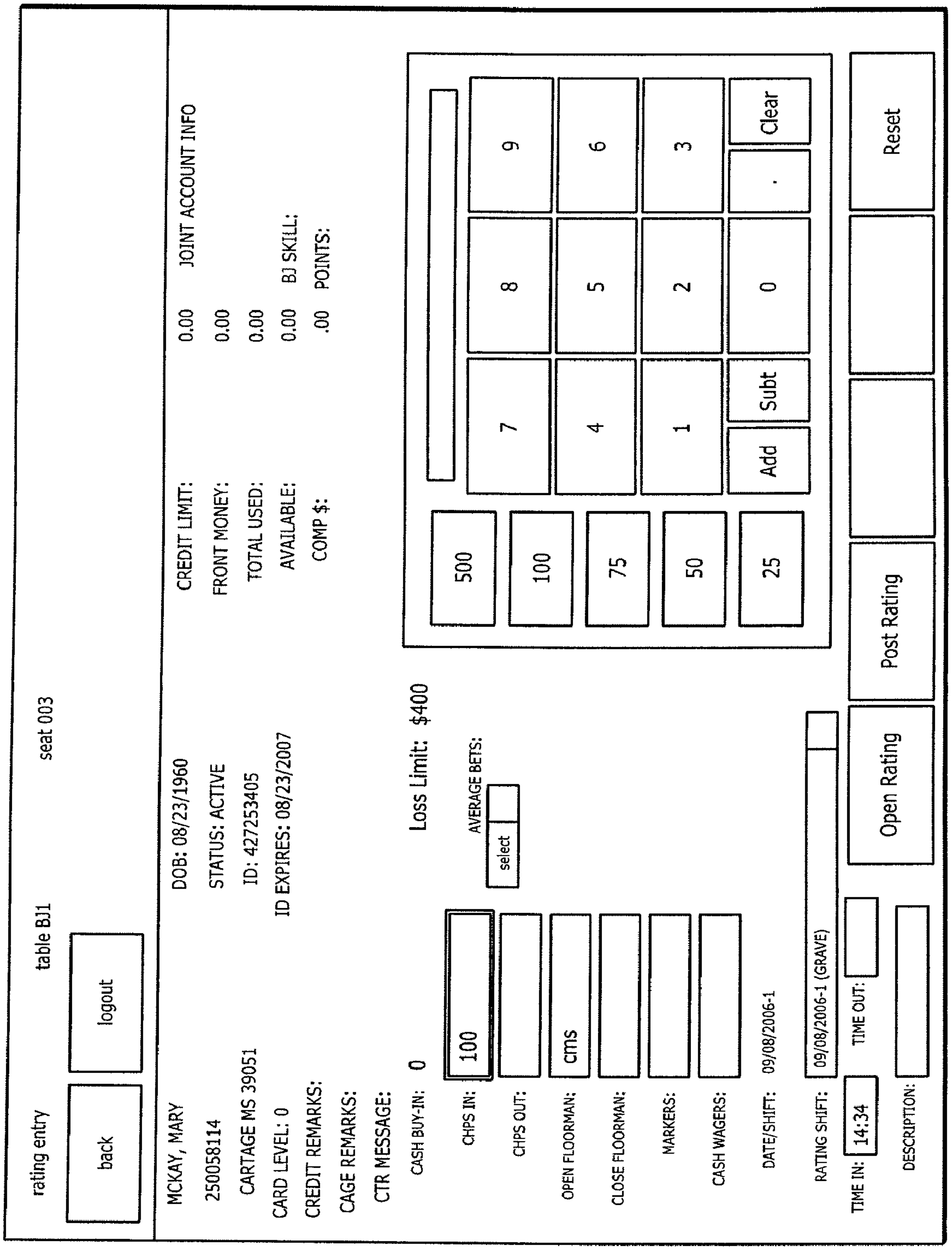
Figure 30:
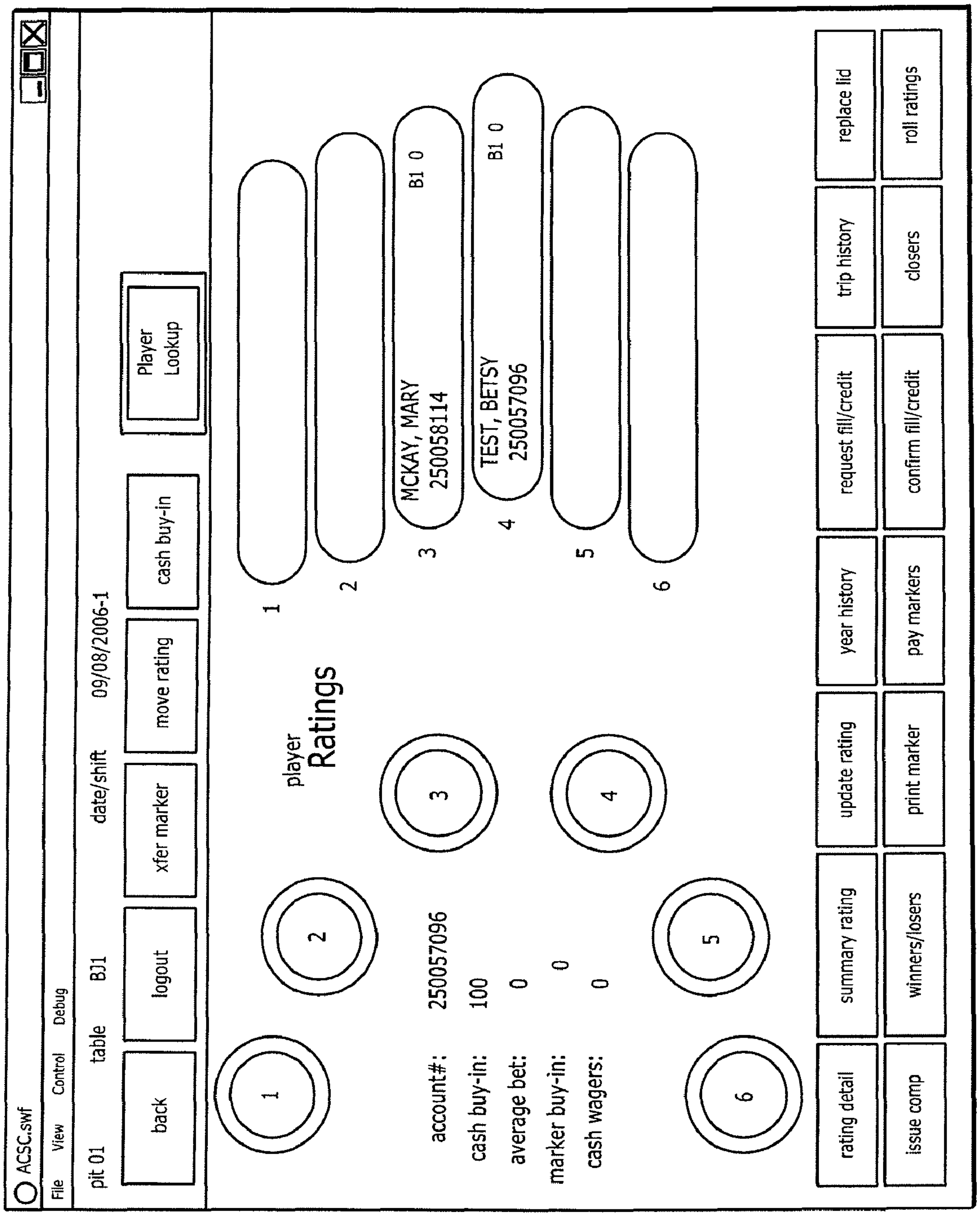
FIG. 30 is an illustration of a screen that presents an updated player rating.
Figure 31:
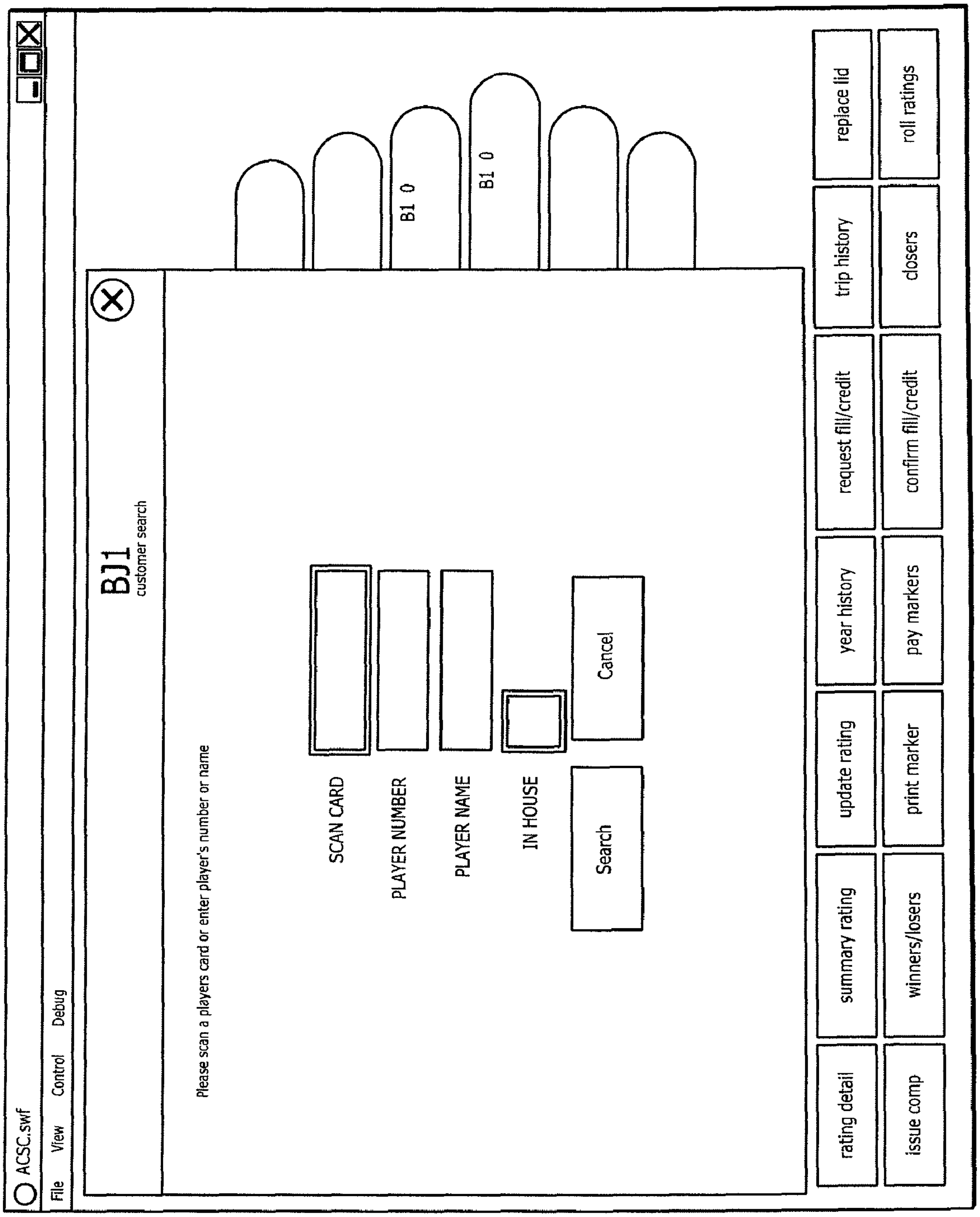
FIG. 31 is an illustration of a screen that presents checking enrollment and a current balance available for loss limit.

Referring now to FIG. 29, an illustration of a screen that presents a request to open rating and a protected cash buy-in are shown. Loss limits and "cash buy-in" are displayed. Players are not allowed to change these values. The "time" parameter is populated with current time but can be backed up. The "open floor-person" parameter is populated with the current logged in users. Continuing, FIG. 30 is an illustration of a screen that presents an updated player rating. Specifically, FIG. 30 presents updating a rating with more cash buy-in. A user simply highlights the player to be updated and then selects the cash buy-in button. FIG. 31 is an illustration of a screen that presents checking enrollment and a current balance available for loss limit. Specifically, FIG. 31 demonstrates the card swipe used to validate that the highlighted player is the same as the swiped card. A "rating cash buy-in" is updated with cash if approved. The "issued by" parameter is populated with the user who is logged in, and the parameter can be changed.

Figure 32:
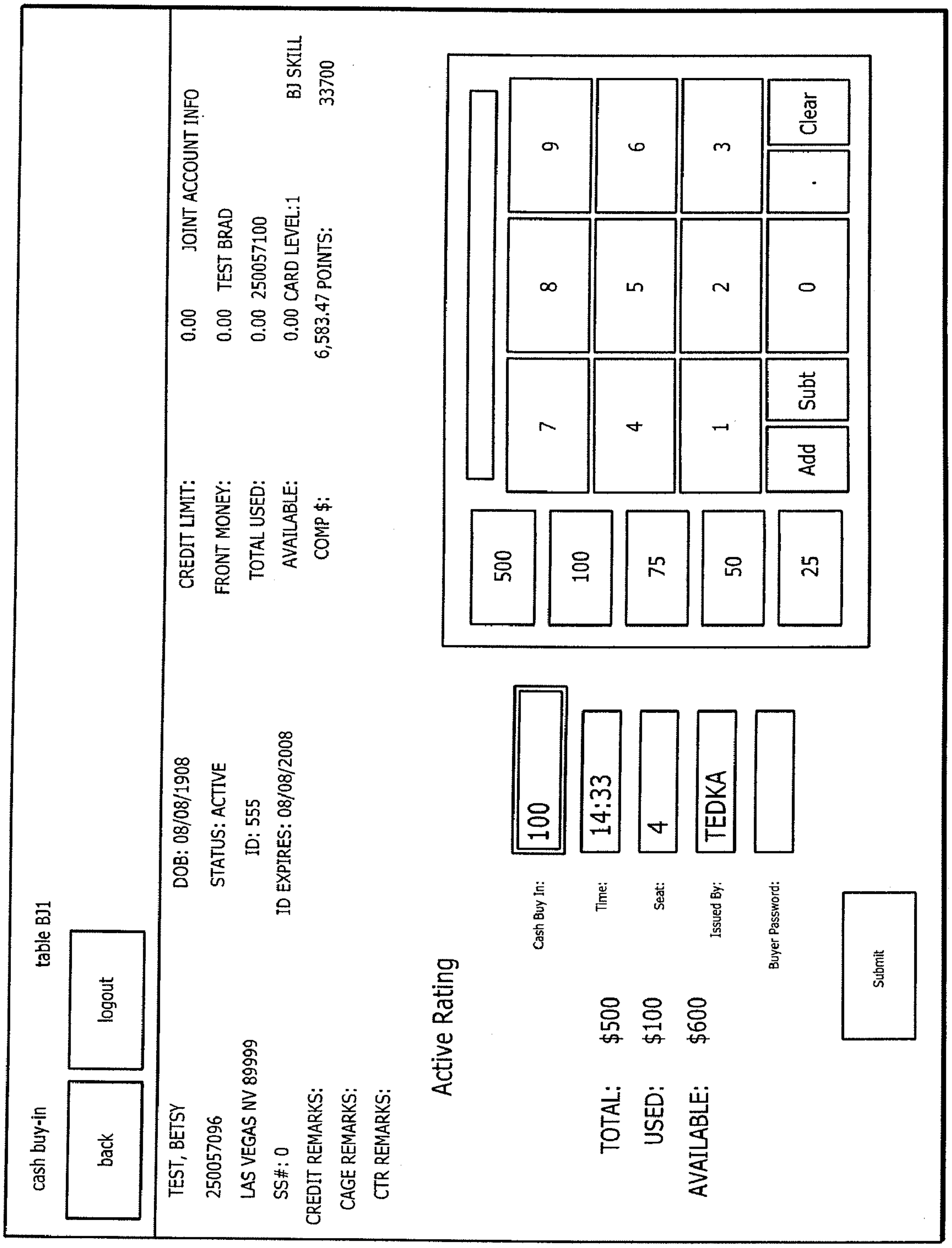
FIG. 32 is an illustration of a screen that presents cash keyed and rechecks submits values.

Referring now to FIG. 32, an illustration of a screen that presents cash keyed and rechecks submit values is shown. The "seat number" parameter is then populated. The user is not allowed to change the seat number. The user then enters the cash buy-in amount and issue password. When submit is selected, the patron's loss limit enrollment and available balance are rechecked in real time. If the buy-in amount is more than the player has available or for any other reason the cash buy-in is not valid, an error message is displayed. A request may also be sent to update the rating. If a user receives a loss limit or any other error during the submission process, the user remains on the "cash buy-in" screen and the loss limit information is updated. The user is then allowed to fix the error and resubmit.

Figure 33:
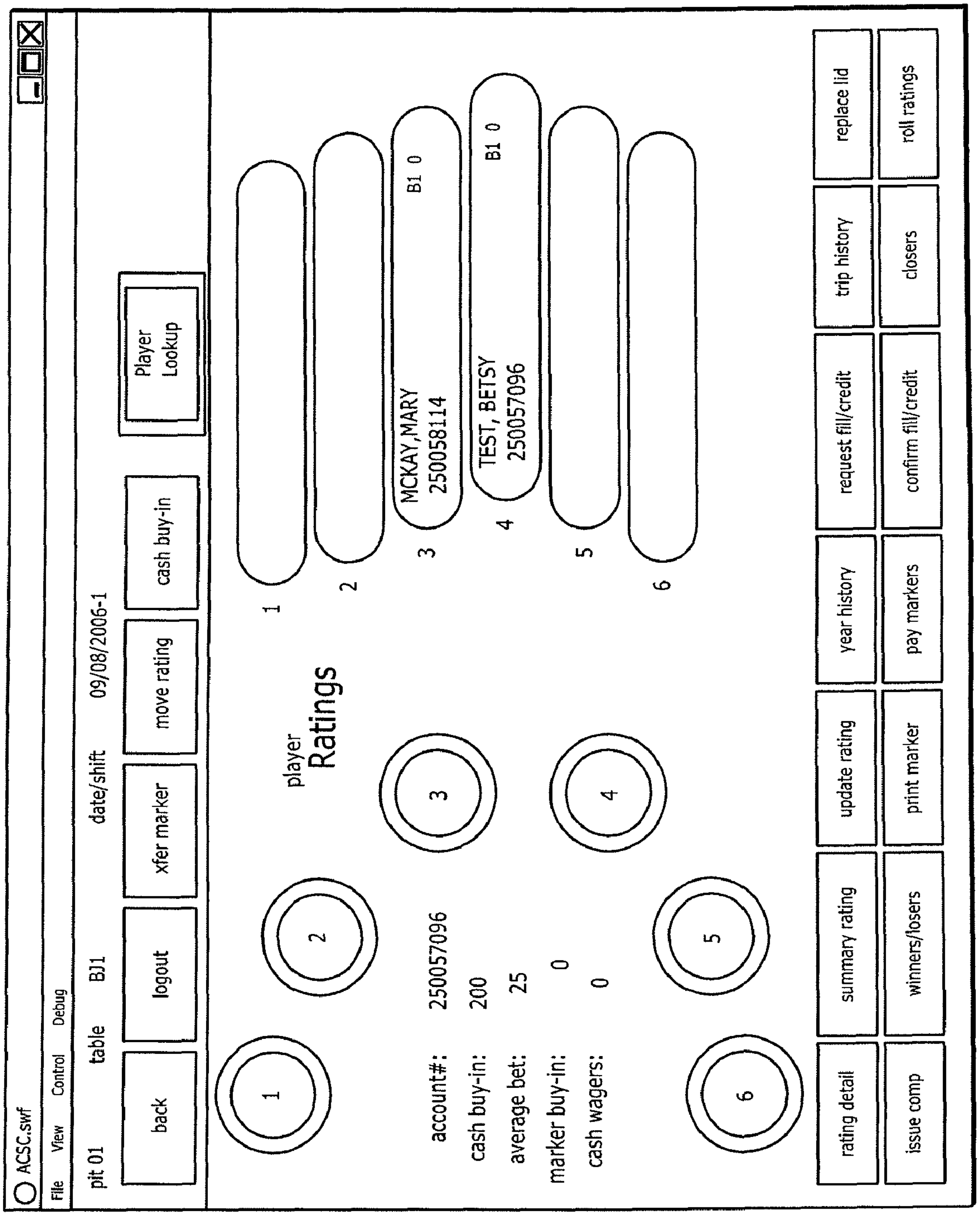
FIG. 33 is an illustration of a screen that presents a successful update of cash and rating.
Figure 34:
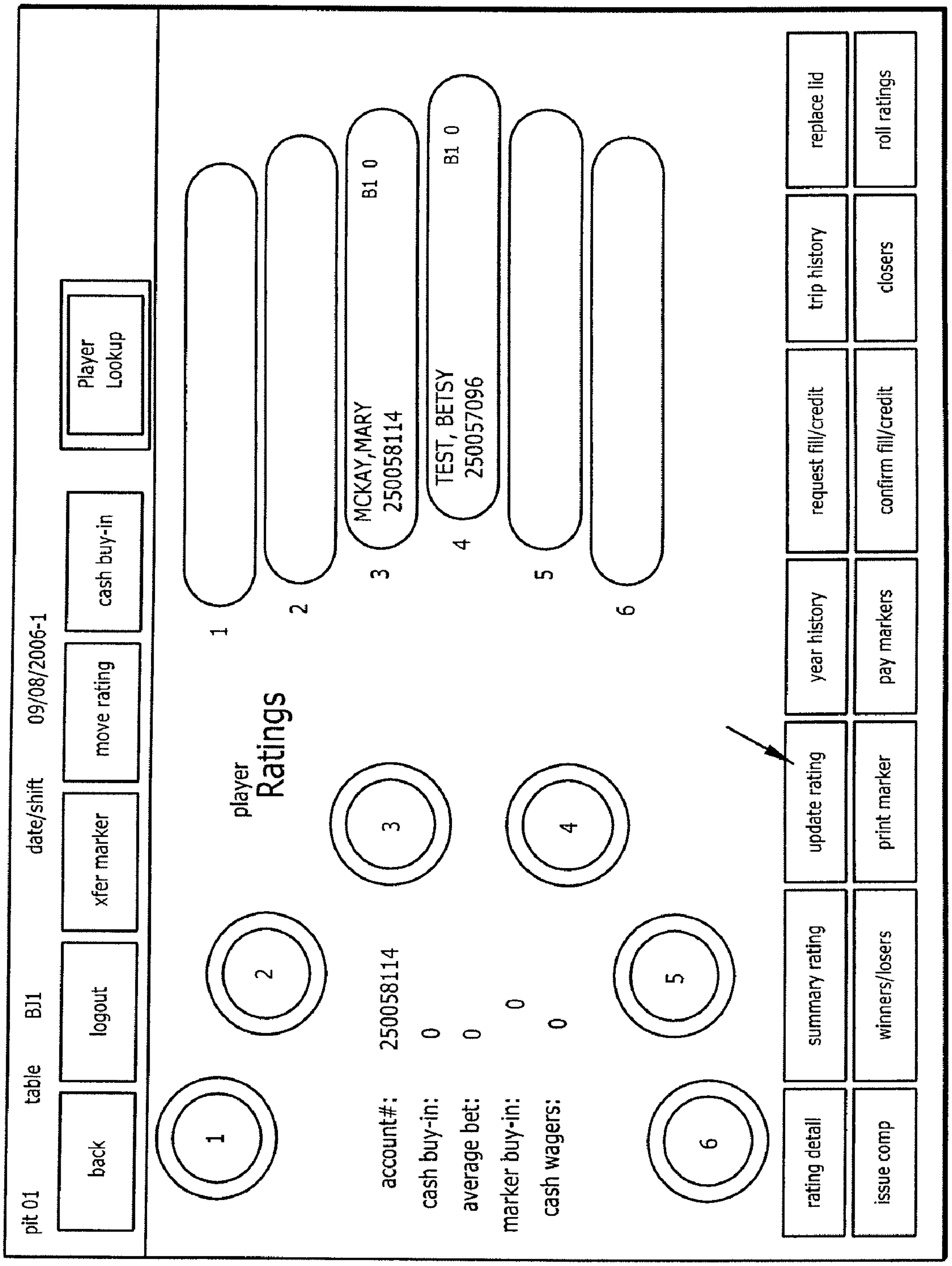
FIG. 34 is an illustration of a screen that presents an updated rating using chips.
Figure 35:
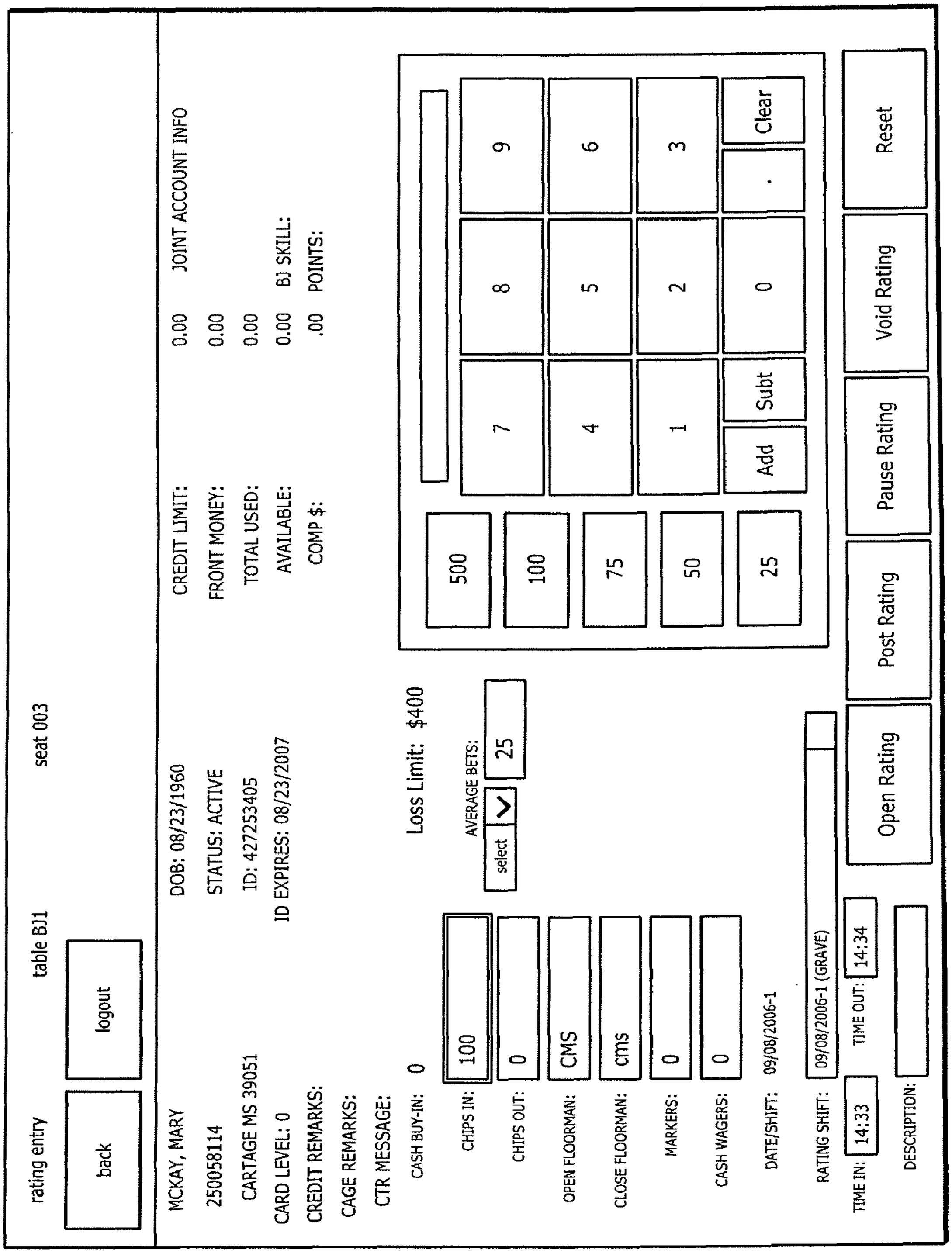
FIG. 35 is an illustration of a screen that presents a display with the current loss limit and rating update.

Referring now to FIG. 33, an illustration of a screen that presents a successful update of cash and rating is shown. Upon a successful cash buy-in transaction, a user is directed back to the table detail screen. The cash buy-in is added to the rating. Additionally, the cash buy-in is reflected in the rating. Continuing, FIG. 34 is an illustration of a screen that presents an updated rating using chips. Specifically, FIG. 34 displays updating a rating using more chips by highlighting the player to be updated, and selecting the "update rating" button/key. FIG. 35 is an illustration of a screen that presents a display with the current loss limit and rating update. Loss limits and "cash buy-in" are displayed. Users are not able to change these values. The "time out" parameter is populated with current time but can be backed up. The "close floor-person" parameter is populated with the current logged in users.

Figure 36:
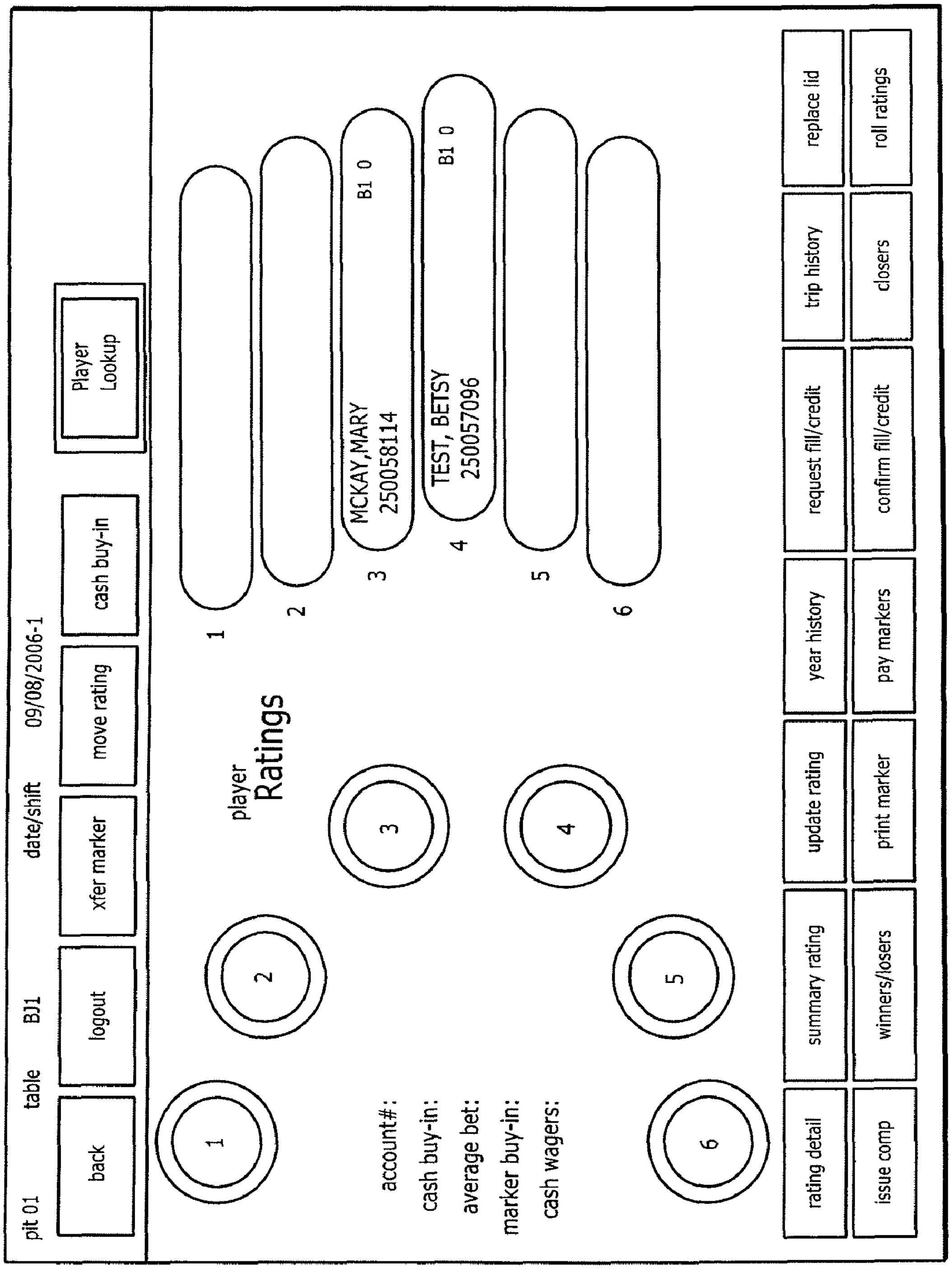
Figure 37:
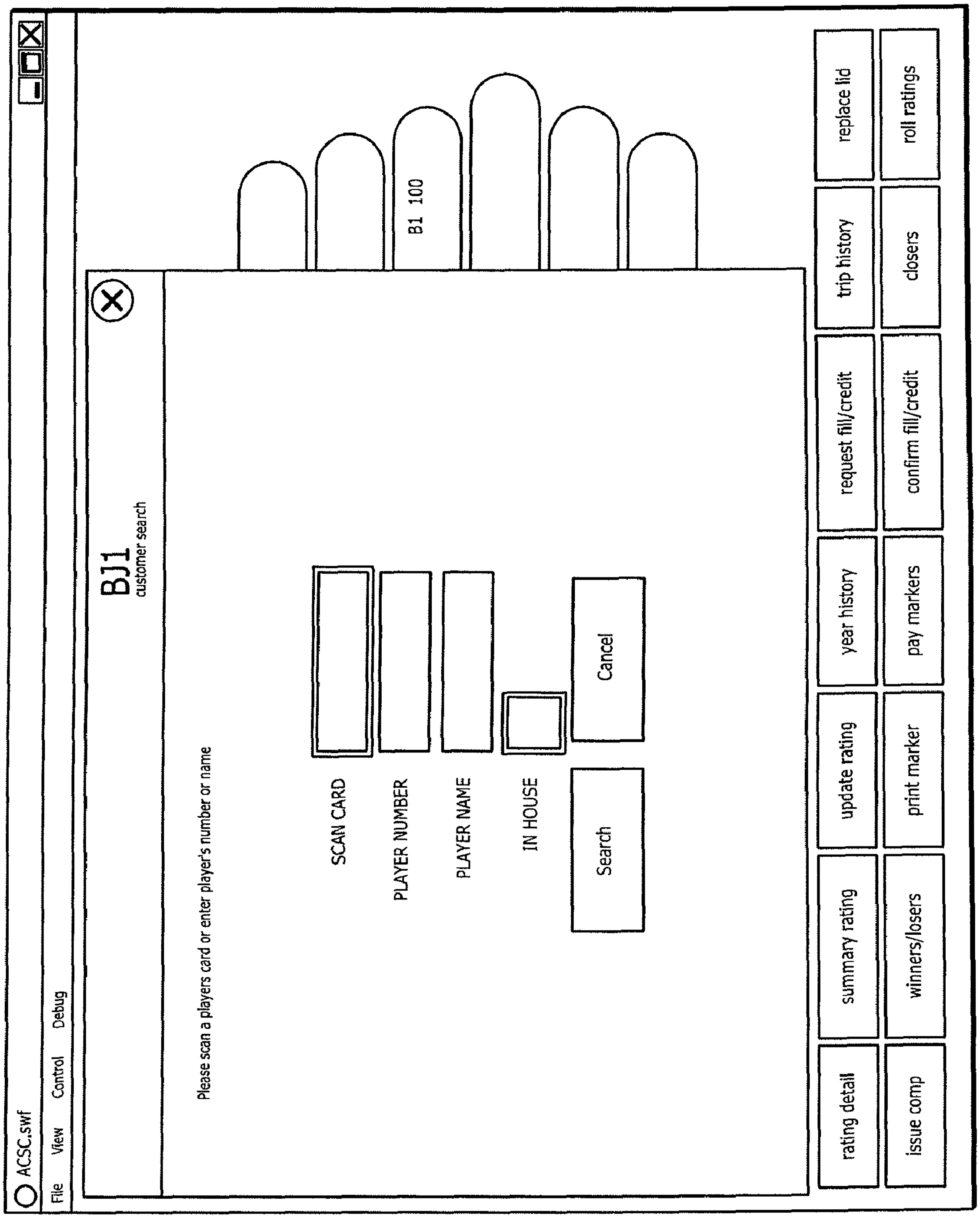
FIG. 37 is an illustration of a screen that presents an enrollment check during patron selection.

Referring now to FIG. 36, an illustration of a screen that presents a "no rating" buy-in is shown. On this screen a user selects the Player Lookup position and highlights it with a ring. The user then selects the "cash buy-in" button/key on the table detail screen. If a user would like to perform a function on a player who is not being rated at the table, the user selects the player lookup position and then selects the button for the function it would like to perform. The same technique is used for the cash buy-in. The player is not yet being rated so the user highlights the player lookup, and then selects the highlighted button/key to perform a cash buy-in transaction. Continuing, FIG. 37 is an illustration of a screen that presents an enrollment check during patron selection.

Figure 38:
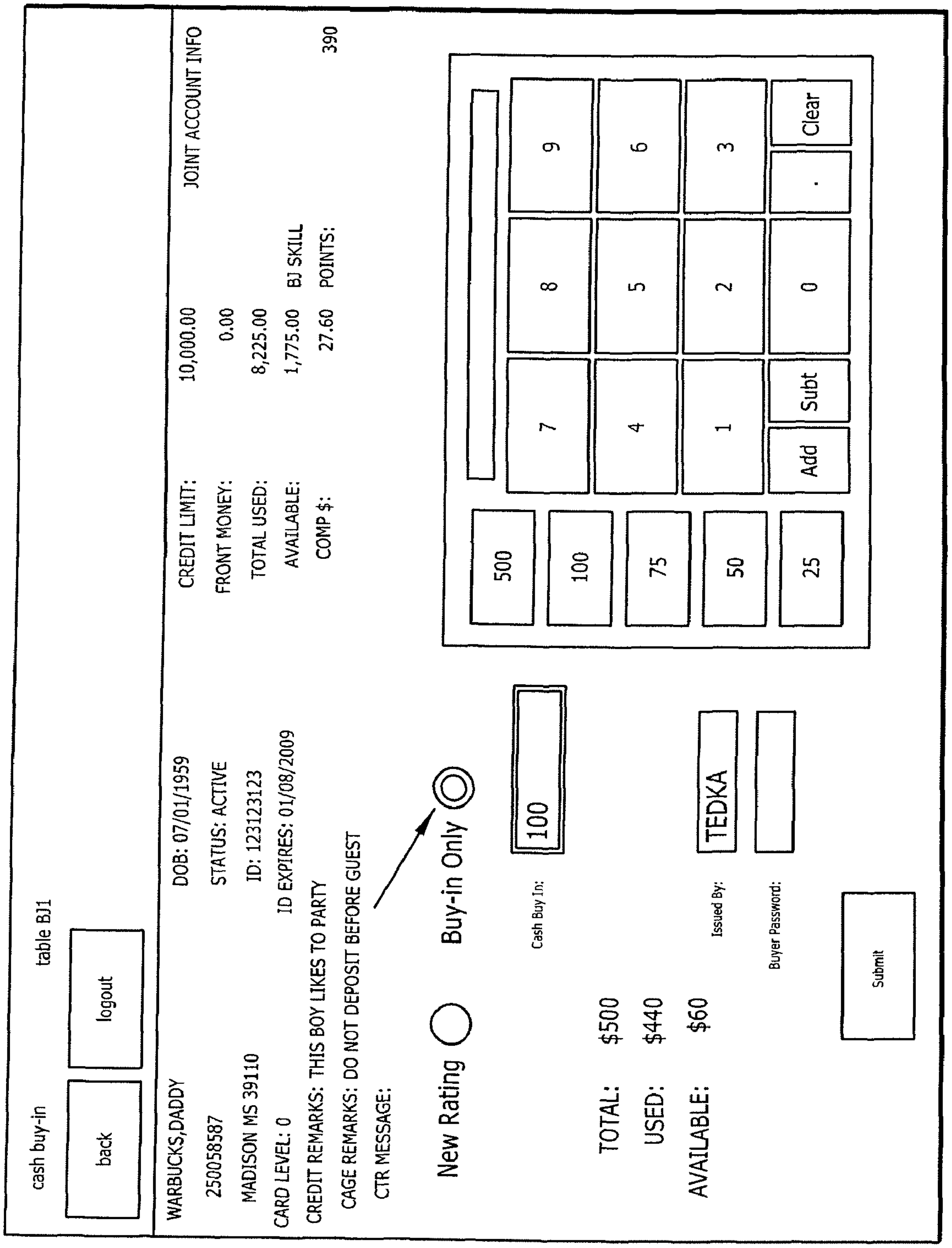
FIG. 38 is an illustration of a screen that presents a buy-in only option.

Referring now to FIG. 38, an illustration of a screen that presents a buy-in only option is shown. In one embodiment, this new rating option is selected by default. The "time" and "seat" parameters are not displayed since they not needed for this option. The transaction is time-stamped when it is completed. The "issued-by" parameter is populated with the user who is logged in. This parameter can be changed. The user then enters the "cash buy-in amount" and "issuer password" parameters.

Figure 39:
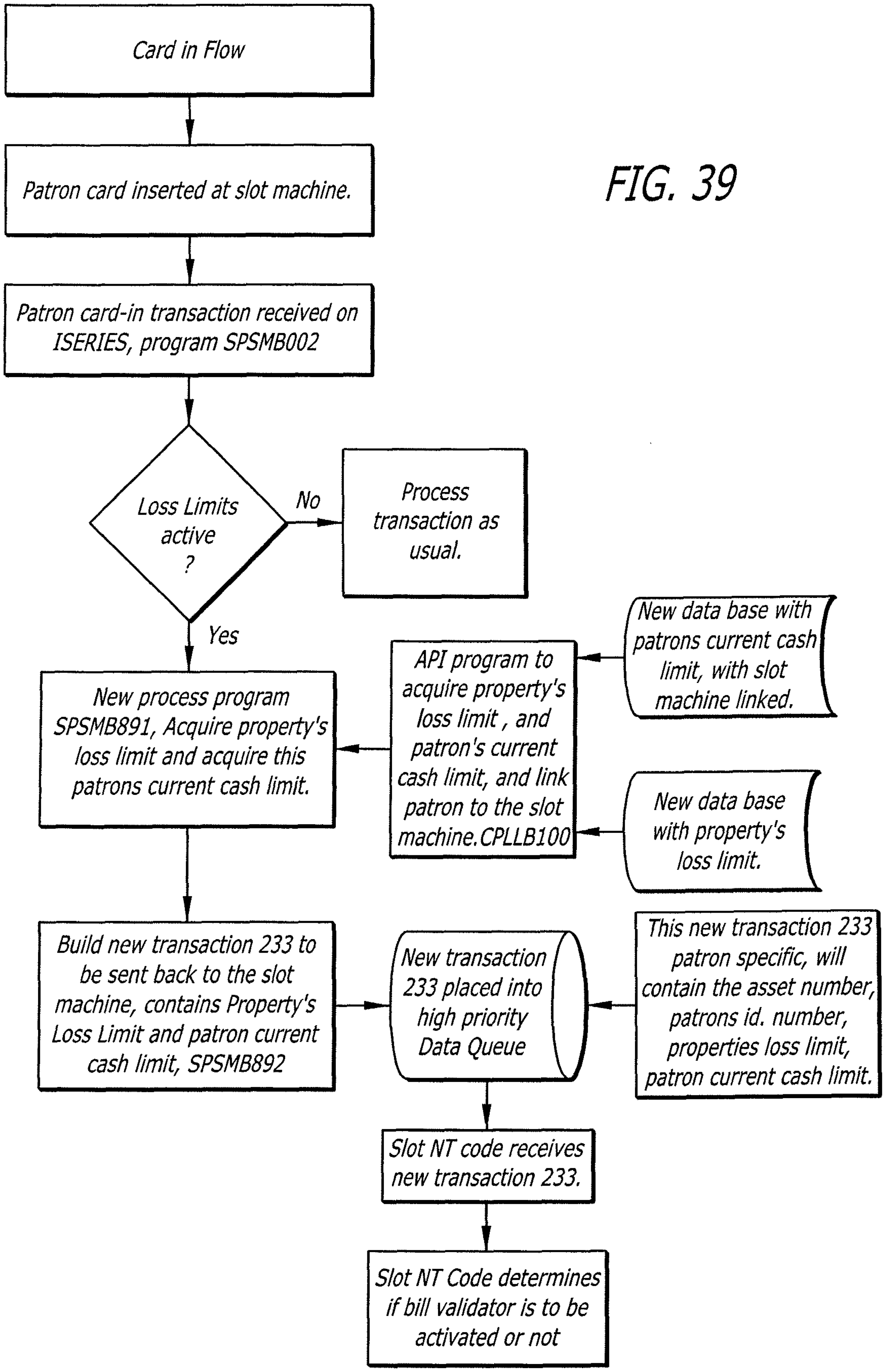
FIG. 39 is a logical flow diagram in a "Card-In" example.
Figure 40:
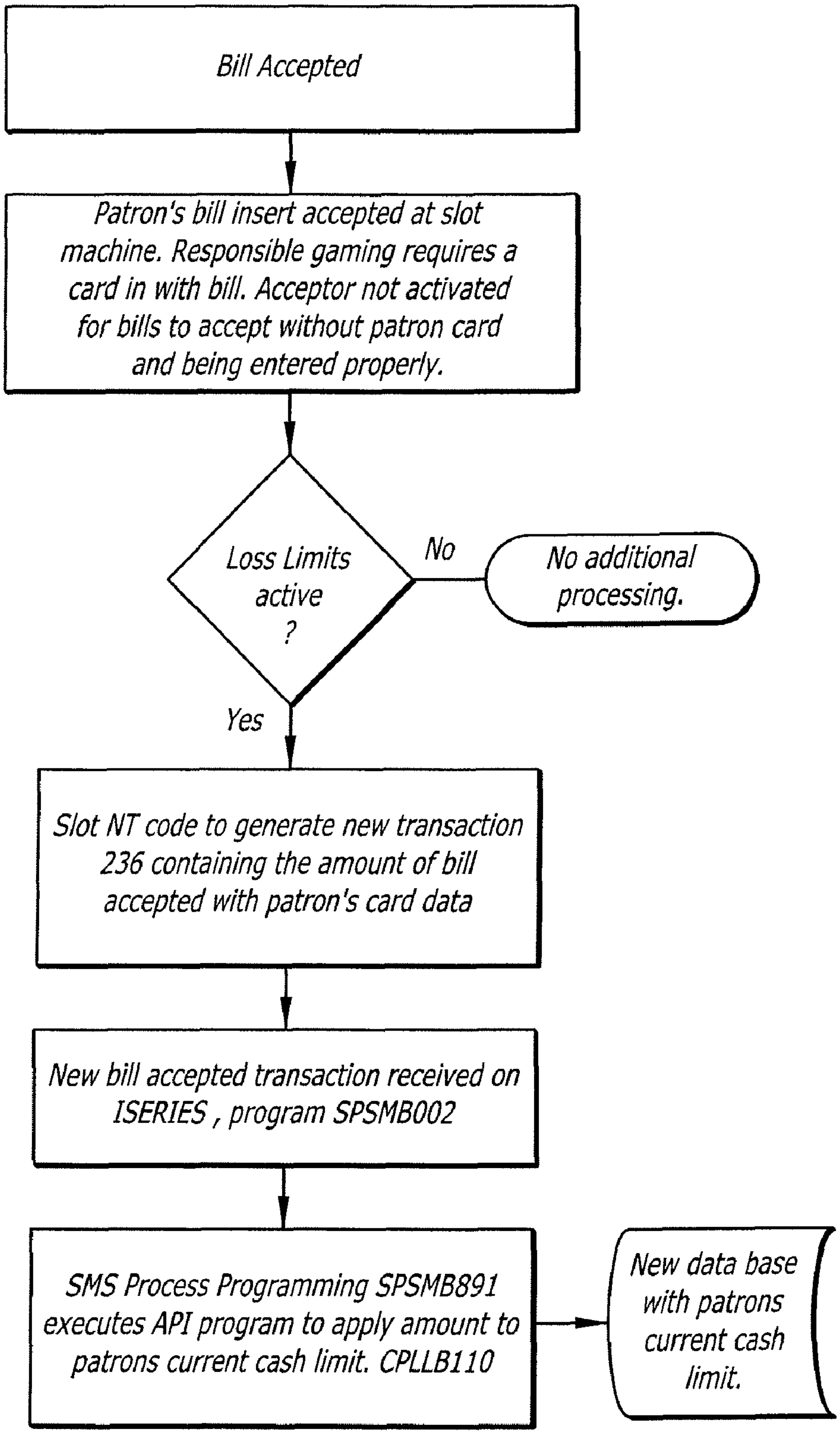
FIG. 40 is a logical flow diagram in a "bill-accepted" example.
Figure 41:
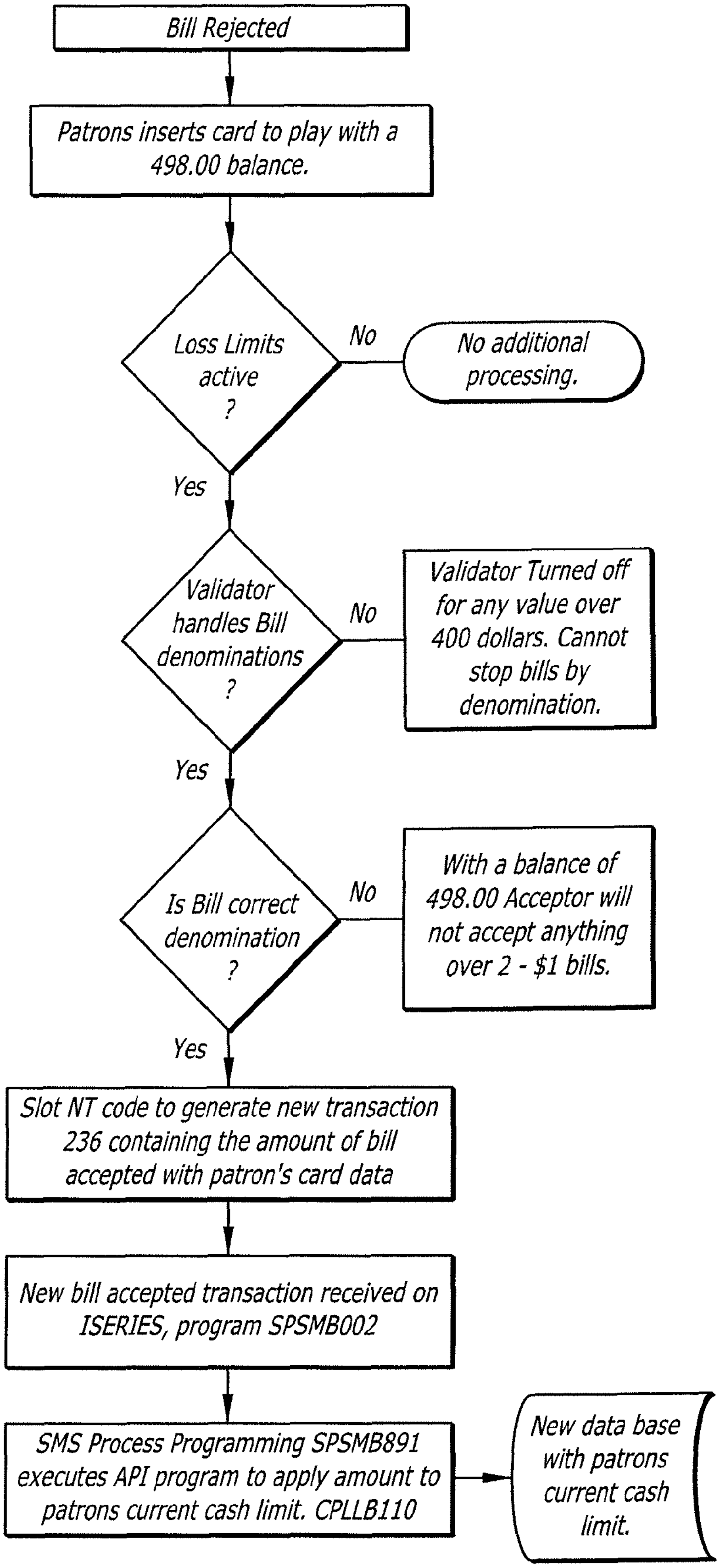
FIG. 41 is a logical flow diagram in a "bill-rejected" example.
Figure 42:
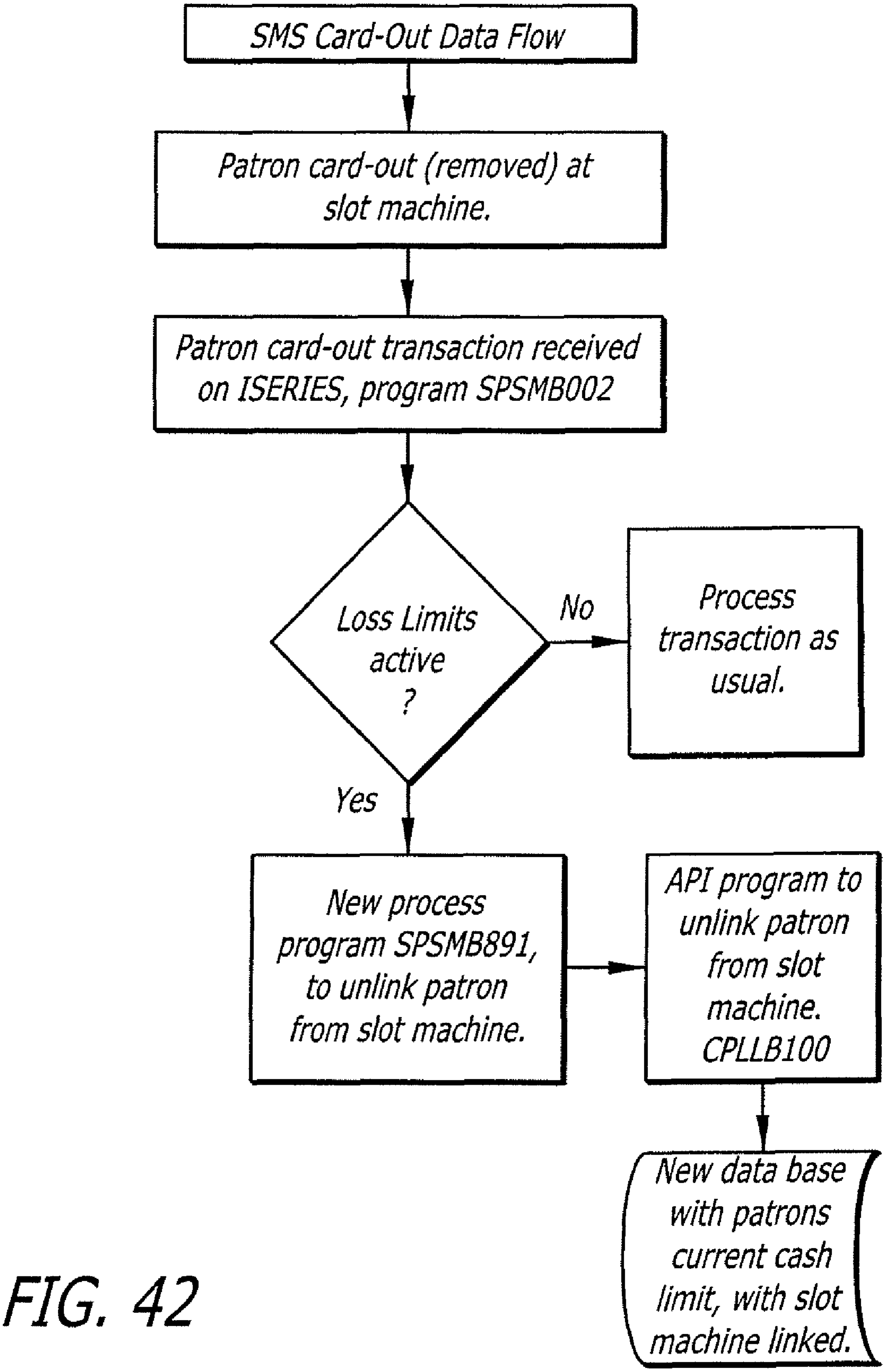
FIG. 42 is a logical flow diagram in a "card-out" example.
Figure 43:
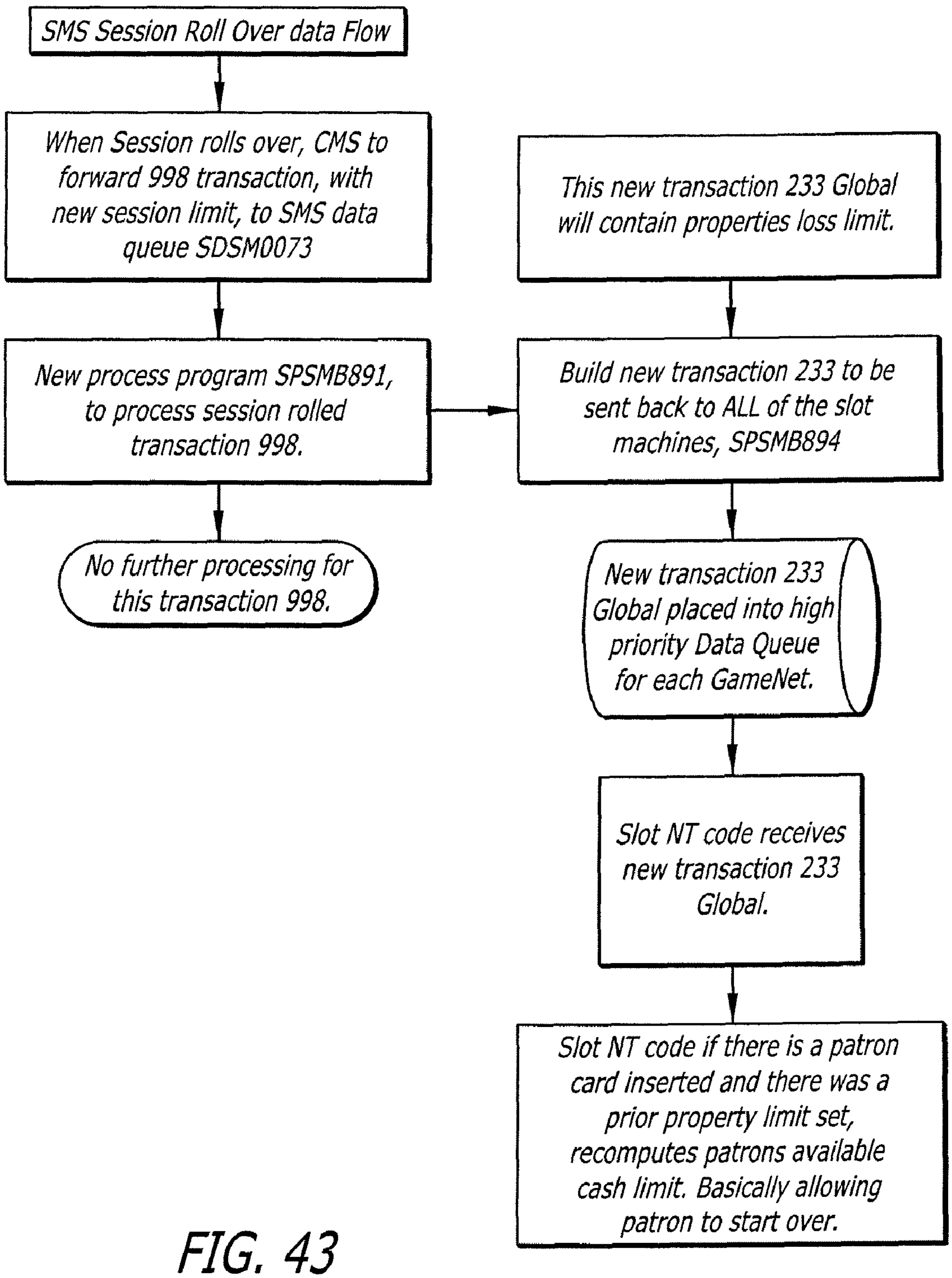
FIG. 43 is a logical flow diagram in a session (excursion) rollover example.
Figure 44:
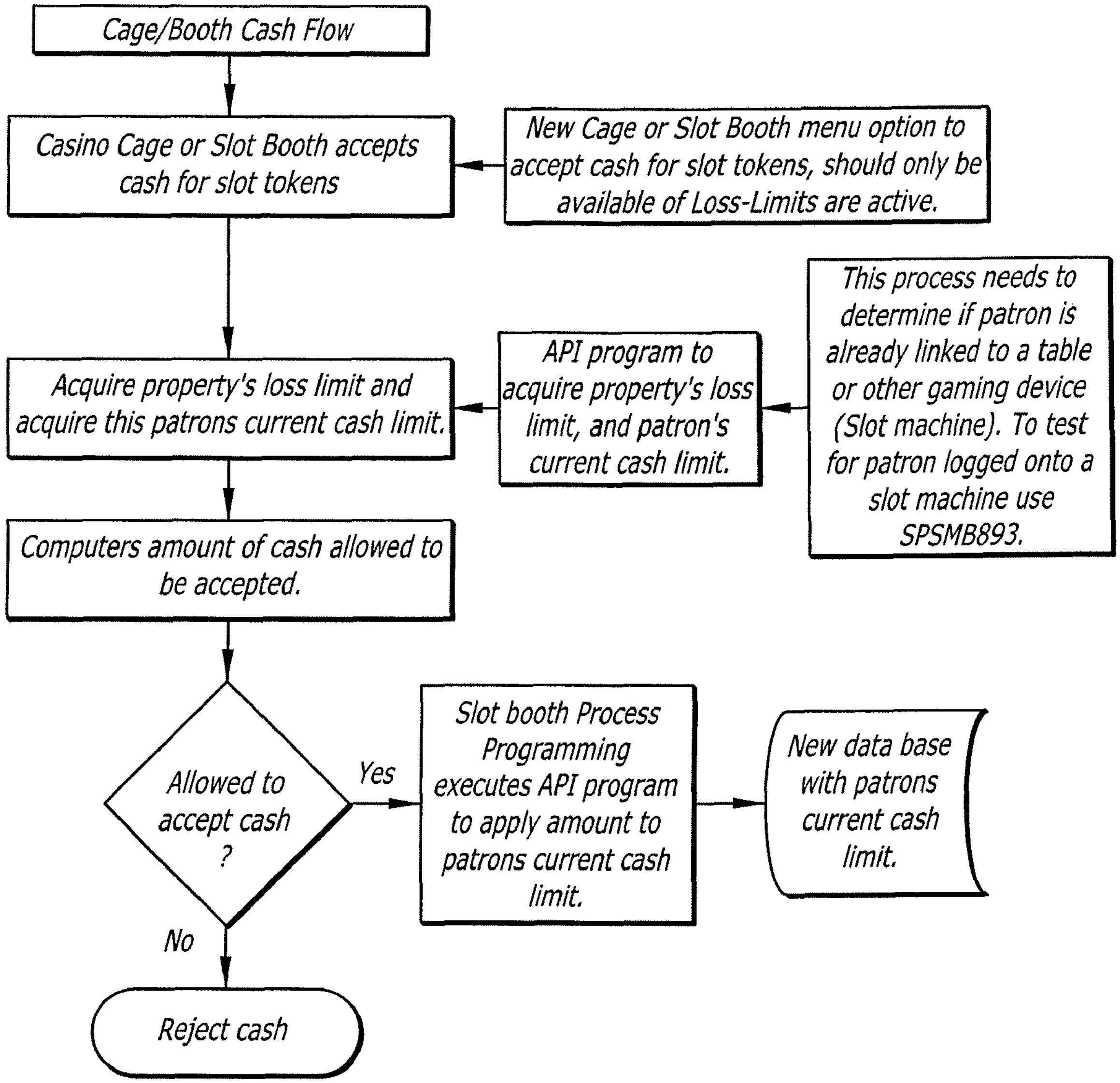
FIG. 44 is a logical flow diagram in a cage/booth cash flow for tokens example.
Figure 45:
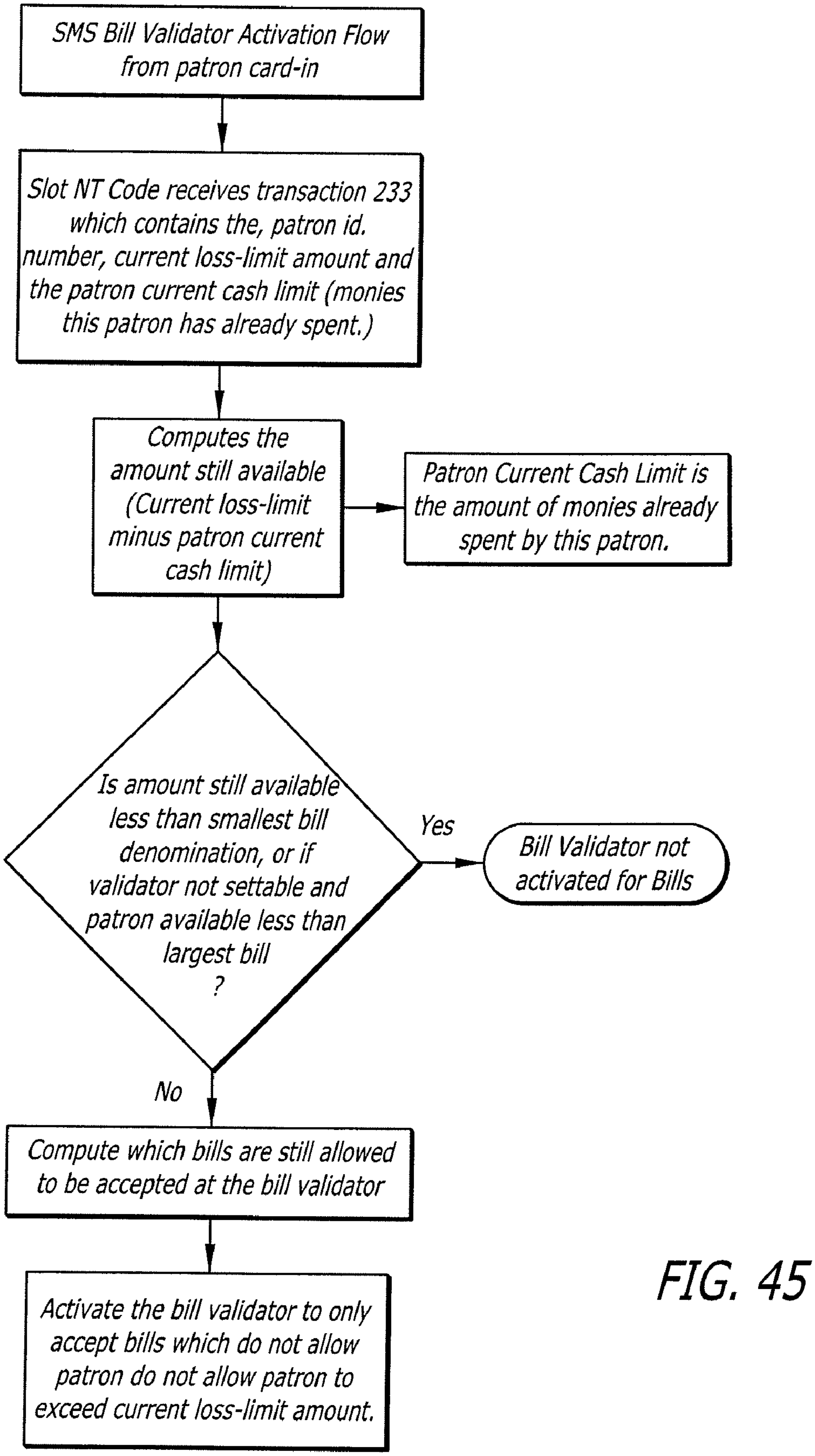
FIG. 45 is a logical flow diagram in a bill validator activation flow from patron "card-in" example.
Figure 46:
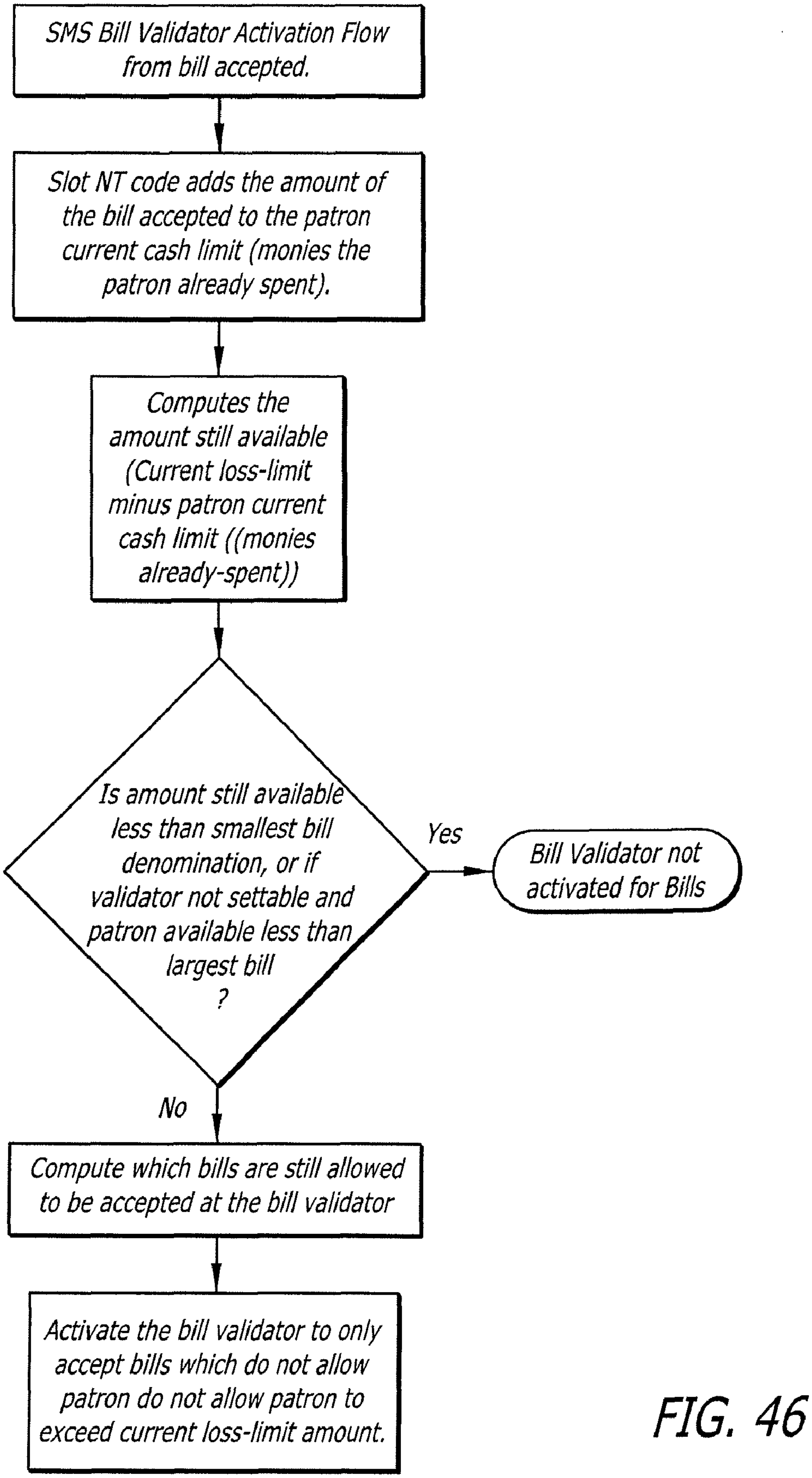
FIG. 46 is a logical flow diagram in a bill validator activation flow from bill accepted example.
Figure 47:
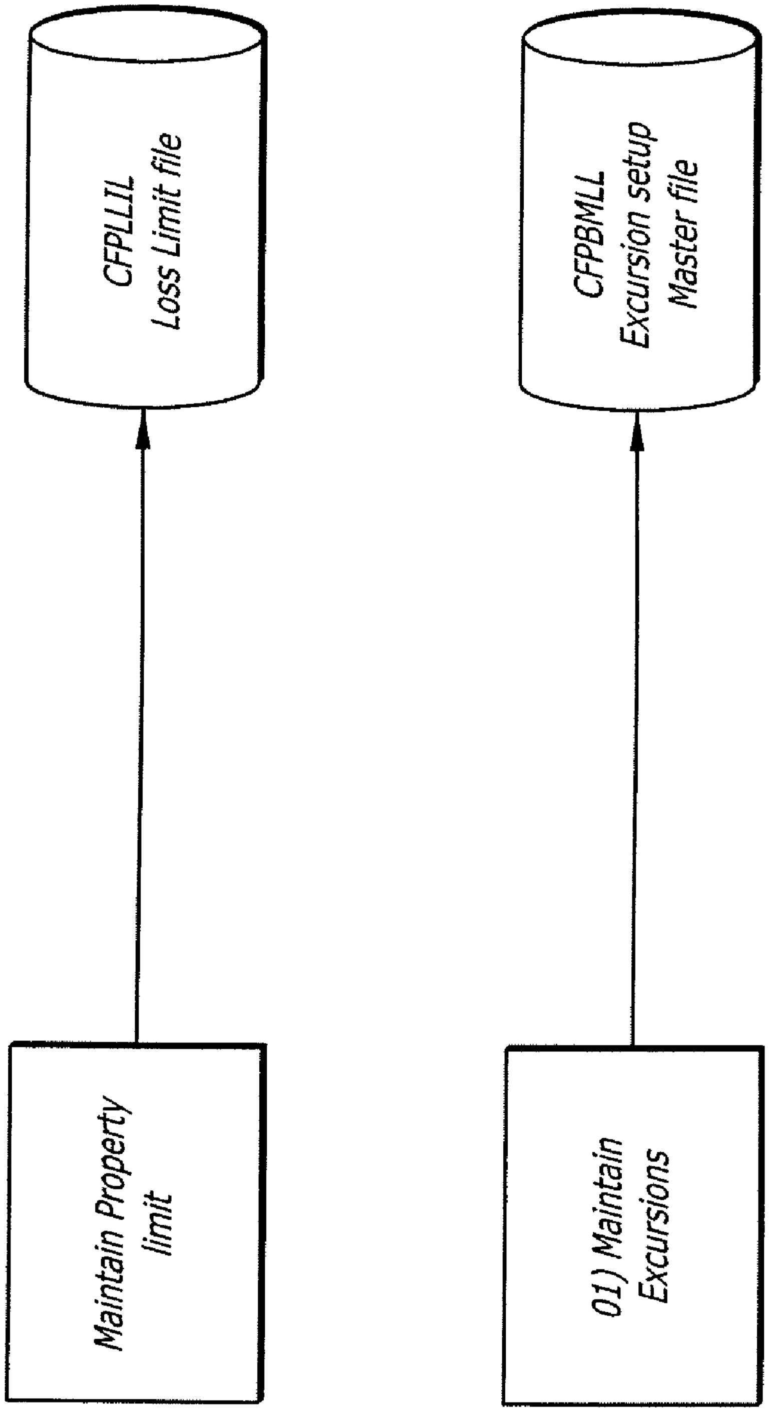
FIG. 47 is a logical flow diagram illustrating two setup step examples.
Figure 48:
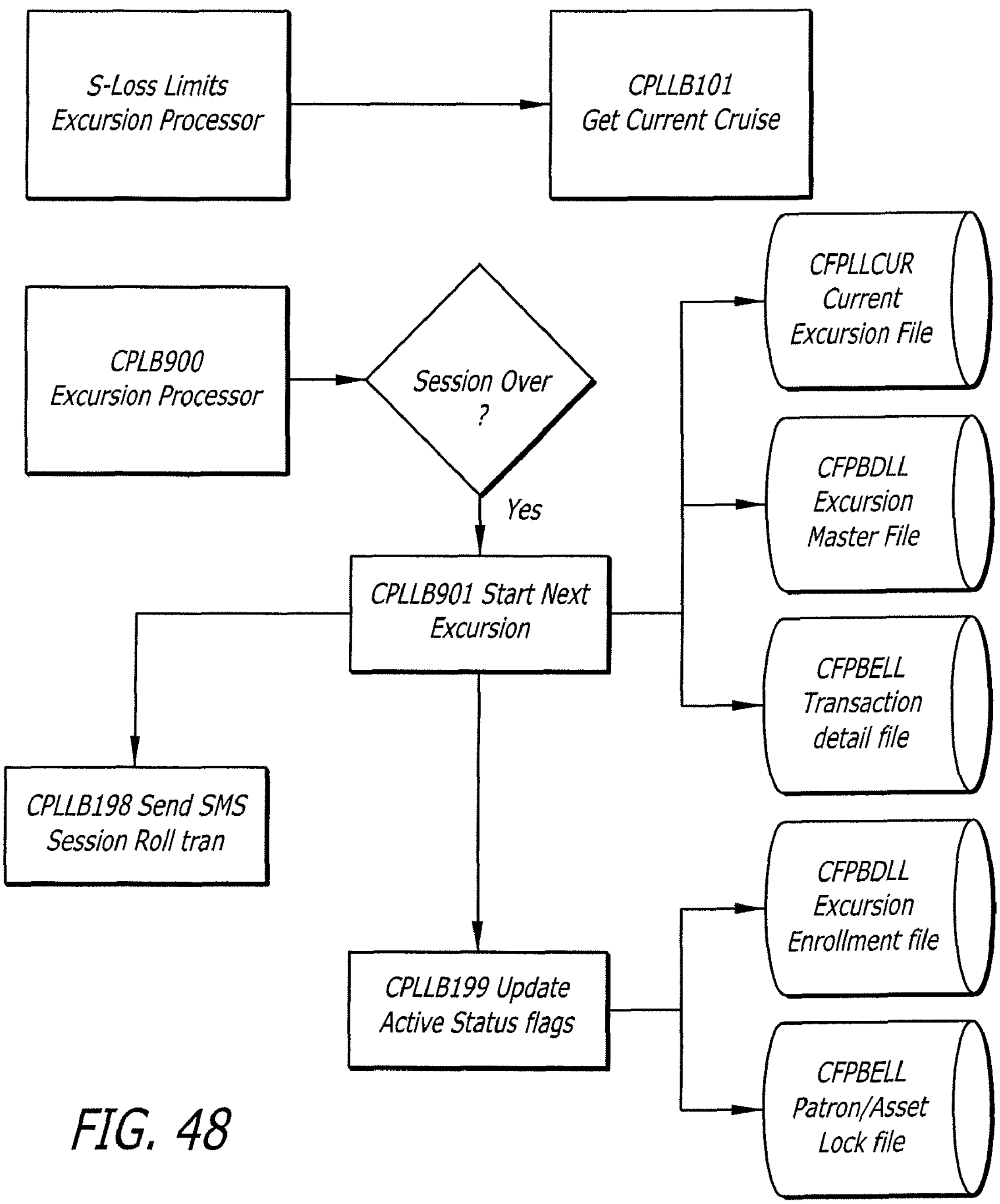
FIG. 48 is a logical flow diagram in a never ending job type example.

Referring now to FIGS. 39-48, logical flow diagrams are presented that show several processes embodying various embodiments of the loss limit method. FIG. 39 is a logical flow diagram in a "Card-In" example. FIG. 40 is a logical flow diagram in a "bill-accepted" example. FIG. 41 is a logical flow diagram in a "bill-rejected" example. FIG. 42 is a logical flow diagram in a "card-out" example. FIG. 43 is a logical flow diagram in a session (excursion) rollover example. FIG. 44 is a logical flow diagram in a cage/booth cash flow for tokens example. FIG. 45 is a logical flow diagram in a bill validator activation flow from patron "card-in" example. FIG. 46 is a logical flow diagram in a bill validator activation flow from bill accepted example. FIG. 47 is a logical flow diagram illustrating two setup step examples. FIG. 48 is a logical flow diagram in a never ending job type example.

Figure 49:
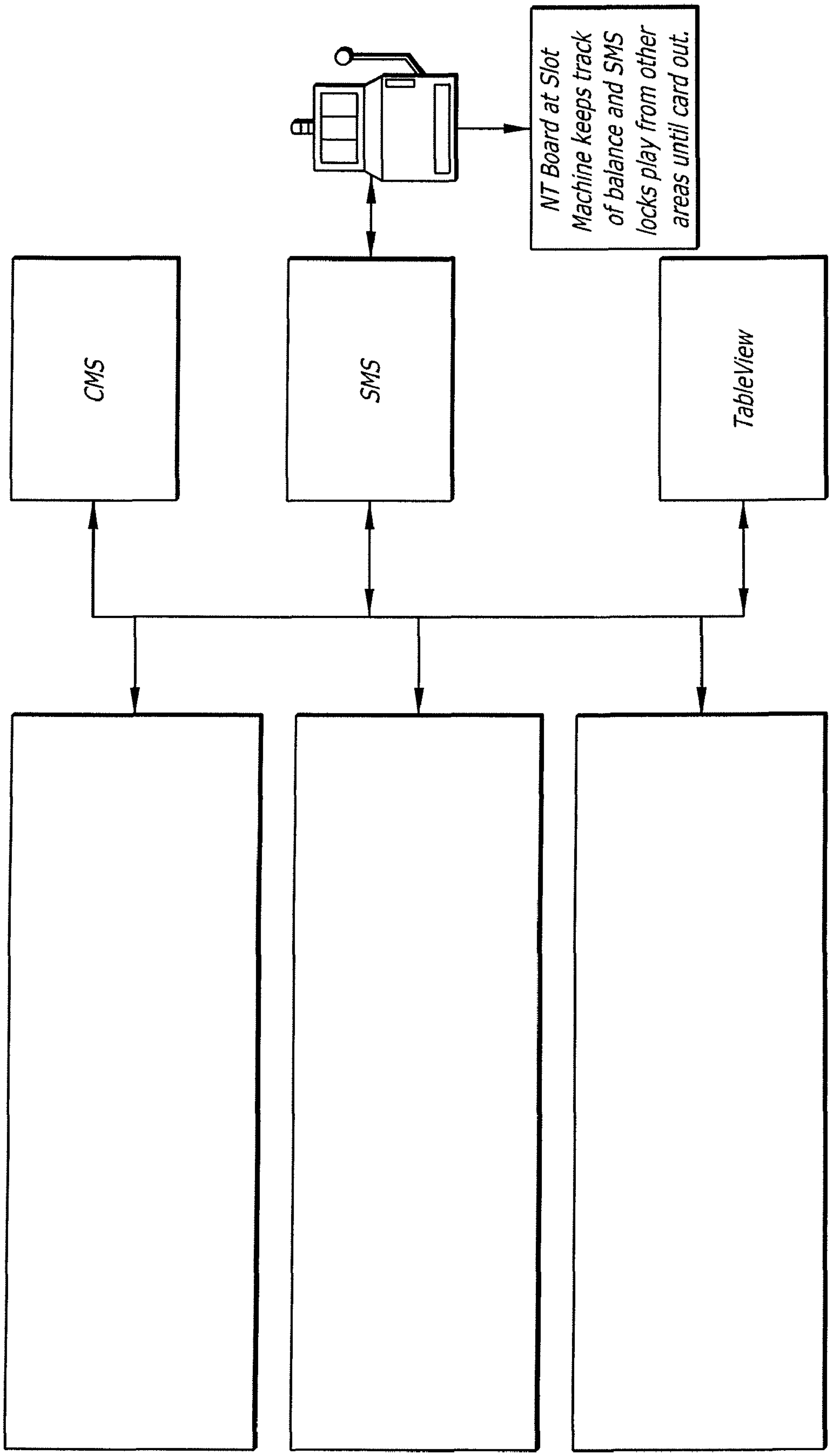
FIG. 49 is a block diagram in a loss limit gaming floor.

Referring now to FIG. 49, the responsible gaming module 30 may interact with a CMS system, a SMS system, and a tableview system. As shown with respect to the functionality of the CMS system 50, the system (1) Defines Excursions or Session; (2) Stores Loss Limit amount per excursion or session by property, corporation or group of properties or patron; (3) Keeps track of Sessions and ending times for all applications using loss limit; (4) Keeps track of players enrolled and what is being used; (5) Stops play when limit reached (i.e., will not allow Operator or Client to draw over the limit per excursion); (6) Processes Job for LossLimits handles stayover count for active patrons at next excursion start time; and (7) Tracks all Players with TableTrak manual open table ratings, slots and other operation areas or gaming devices based on gaming date.

As shown with respect to the functionality of the SMS system 60, the system includes the following: (1) Card inserted and player checked for enrollment and balance available; (2) Receive 233 transaction sent from Loss Limit job that identifies balance; (3) Validator is activated for bills that can be accepted by bill acceptor; (4) Patron inserts cash and plays; (5) Patron inserts new bill, notified only X dollars available. Patron inserts smaller bill denomination; (6) Patron continues play and is activated as a stayover for next session; (7) Patron cash inserts bill that is accepted, balance is updated on NT and transaction 236 sent to the patron balance; (8) Patron removes card. Transaction sent and patron cash balance is unlocked from slot area so patron can play at other gaming devices; (9) Patron is not active during next session and not counted in stayovers on CMS; and (10) Patron leaves area and reenters in 5 hours for same gaming date. Counted as reenroll and has available balance.

As shown with respect to the functionality of the tableview system 70, the system includes the following: (1) Patron plays at Table Game with TableView system; (2) Card swiped to check enrollment and buy in cash. If approved, patron rating is updated with cash buy-in; (3) CMS process keeps track of patron balance. No play on game until new buy-in of cash is approved; (4) Chip only ratings are not tracked for Loss Limit Buy In.

Referring back to FIG. 1, in another embodiment, the responsible gaming module 30 is in communication with one or more of the displays 16, 17 of the gaming device 10. The responsible gaming message may be presented on the main video display 17, a secondary display 16 in the main cabinet 12 or top box 14, a display (not shown) associated with a player tracking system, or any combination thereof. According to one embodiment, the responsible gaming module is a component of a user interface display as disclosed in U.S. patent application Ser. No. 10/943,771 entitled "User Interface System and Method for a Gaming Machine" filed on Sep. 16, 2004, which is hereby incorporated by reference. In this embodiment, the responsible gaming module uses the processor associated with the user interface display to manage the presentation of a responsible gaming message on a gaming device 10. Additionally, the processor of the user interface display manages the presentation of responsible gaming message on one or more user interface displays and may be in communication with other user interface displays or other displays on other gaming devices 10.

In yet another embodiment, the responsible gaming module is a component of a backend system or server such as, but not limited to, a player tracking system or a slot management system. In another embodiment, the responsible gaming module is a separate system that is in communication with one or more backend systems as well as the game monitoring units of one or more gaming devices 10.

As shown in FIG. 1, the main cabinet 12 of the gaming device 10 is a self-standing unit that is generally rectangular in shape. Alternatively, in other embodiments, the gaming cabinet may be a slant-top gaming cabinet or any shaped cabinet known or developed in the art. Additionally, the cabinet may be manufactured with reinforced steel or other rigid materials that are resistant to tampering and vandalism. Optionally, in an alternate embodiment, the gaming device 10 may instead be a cinema-style gaming device (not shown) having a widescreen display, as disclosed in U.S. application Ser. No. 11/225,827, entitled "Ergonomic Gaming Cabinet," filed on Sep. 12, 2005, which is hereby incorporated by reference.

As described above, the gaming device 10 includes a main display 17. According to one embodiment, the main display 17 is a plurality of mechanical reels for presenting a slot-style game. Alternatively, the main display 17 is a video display for presenting one or more games such as, but not limited to, mechanical slots, video slots, video keno, video poker, video blackjack, video roulette, Class II bingo, games of skill, games of chance involving some player skill, or any combination thereof.

According to yet another embodiment, the main display 17 is a widescreen display (e.g., 16:9 or 16:10 aspect ratio display). In one embodiment, the display 17 is a flat panel display including by way of example only, and not by way of limitation, liquid crystal, plasma, electroluminescent, vacuum fluorescent, field emission, LCOS (liquid crystal on silicon), and SXRD (Silicon Xtal Reflective display), or any other type of panel display known or developed in the art. These flat panel displays may use panel technologies to provide digital quality images including by way of example only, and not by way of limitation, EDTV, HDTV, or DLP (Digital Light Processing). The widescreen display 17 may be mounted in the gaming cabinet 12 in a portrait or landscape orientation. In another embodiment, the game display 17 may also include a touch screen or touch glass system (not shown). The touch screen system allows a player to input choices without using any electromechanical buttons 13. Alternatively, the touch screen system may be a supplement to the electromechanical buttons 13.

According to one embodiment, the top box 14 is a separate and distinct component that is affixed to the main cabinet 12. In another embodiment, the top box 14 is an area that is partitioned from the main cabinet 12. Alternatively, the top box 14 and the main cabinet 12 may be contiguous areas with the outward appearance of two distinct components. According to one embodiment, the top box 14 includes a display glass. The display glass may include the name of the game, artwork, game instructions, pay table, or other information relating to the game.

According to another embodiment, the top box 14 includes a secondary display for displaying game information (e.g., name of the game, game marquee, animation, one or more pay tables, game information, one or more help menus, one or more secondary games, progressive jackpot information or tournament game information) or non-game related information (e.g., news, advertisements, messages or promotions). The secondary display 16 may be a flat panel display, dot matrix display, cathode ray tube display, display glass, backlit display glass, diorama, three-dimensional relief, pachinko-style secondary game, one or more wheels, one or more mechanical reels, or a combination thereof. The display 16 may have a wide screen aspect ratio (4:3, 16:9, 16:10 or the like) and the display may or may not include a touch screen or other touch device associated therewith. Optionally, the secondary display is movable (e.g., tilted a few degrees downward or upward) so that the display is more easily viewed by a casino patron. The movement of the display may be done manually or automatically (e.g., motor or linear actuator).

Additionally, as shown in FIG. 1, the top box 14 includes a candle 21 having three tiers. As those skilled in the art will appreciate, other embodiments of the candle 21 may include one or more tiers. The tiers may be jointly or individually illuminated with one or more incandescent light bulbs or light emitting diodes (LEDs). In one embodiment, the bottom tier 23 of the candle 21 includes a plurality of multi-colored LEDs. Additionally, a plurality of LED reflectors (not shown) are provided within the bottom tier 23 of the candle 21. For example, in one embodiment, eight reflectors are provided within the bottom tier in a octagonal configuration (when viewed from above). Accordingly, the LEDs in the bottom tier 23 of the candle 21 may be alternately illuminated (in the same or different colors) around the circumference of the bottom tier to simulate a rotating light. Alternatively, the LEDs may flash in one or more colors. Accordingly, the LEDs in the bottom tier 23 of the candle 21 may be programmed to illuminate when a responsible gaming message is presented to the player or a jackpot is triggered. The lights in the top tiers of the candle 21 may be illuminated to signal that a player needs assistance from a casino floor employee, a jackpot has been won, or that a responsible gaming message has been presented to a player.

As shown in FIG. 1, the gaming device 10 includes a plurality of player-activated buttons 13. These buttons 13 may be used for various functions such as, but not limited to, selecting a wager denomination, selecting a number of games to be played, selecting the wager amount per game, initiating a game, or cashing out money from the gaming device 10. The buttons 13 function as input mechanisms and may include mechanical buttons, electromechanical buttons or touch screen buttons. In another embodiment, one input mechanism is a universal button module that provides a dynamic button system adaptable for use with various games, as disclosed in U.S. application Ser. No. 11/106,212, entitled "Universal Button Module", filed Apr. 14, 2005 and U.S. application Ser. No. 11/223,364, entitled "Universal Button Module", filed Sep. 9, 2005, which are both hereby incorporated by reference. Additionally, other input devices, such as but not limited to, touch pad, track ball, mouse, switches, and toggle switches, are included with the gaming device 10 to also accept player input. Optionally, a handle 15 may be "pulled" by a player to initiate a slots-based game.

In an alternate embodiment, a cellular phone or other input device (e.g., PDA), separate and apart from the gaming device 10 may also be used to input various player choices and information to enhance the player's interactive experience with the gaming device 10. Furthermore, inputting information via these devices provides an added level of security as any key presses may be hidden from view. In yet another embodiment, a player may call or send a text message or a short message service (SMS) to the gaming device 10.

Additionally, the gaming device 10 includes a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on the gaming device 10. These input components include, but are not limited to, a slot 27 for receiving a player tracking card, a keypad or equivalent, an electronic button receptor, a touch screen and the like. The player tracking system may also include a database of all qualified players (i.e., those players who have enrolled in a player rating or point accruing program). Generally, the database for the player tracking system is separate from the gaming device 10.

In another embodiment, the gaming device 10 includes an internet connection or other known network connections to link one or more gaming devices 10 together. According to one embodiment, the internet connection is used for web browsing, prize redemption, or access to other gaming or non-gaming information. Additionally, with the various gaming devices in communication with one another (or a system host), the gaming device 10 may participate in a gaming tournament. In one embodiment, the gaming tournament is a competitive gaming tournament having one (or a few) winners. Alternatively, the gaming tournament is a cooperative gaming tournament where all eligible gaming devices 10 win a particular award.

One of ordinary skill in the art will appreciate that not all gaming devices 10 have all these components and may have other components in addition to, or in lieu of, those components mentioned here. Furthermore, while these components are viewed and described separately, various components may be integrated into a single unit in some embodiments.

Referring now to FIG. 2, a casino gaming system 100 is illustrated. The casino gaming system 100 comprises one or more gaming devices 10. In various embodiments, any of the gaming devices 10 may be any type of electronic or mechanical gaming devices, such as, but not limited to, a mechanical reel spinning slot machine, video slot machine, video poker machine, keno machine, video blackjack machine, or a gaming device 10 offering one or more of the above-described games. Examples include, but are not limited to, the S6000 mechanical reel spinner and the Alpha video slot machine from Bally Technologies, Inc. The gaming devices 10, illustrated in FIG. 2 act as terminals for interacting with a player playing a casino game. Networking components facilitate communications between the system server 112 and game management units 126 that control displays for carousels of gaming devices 10 across a network. Game management units (GMU's) 126 connect gaming devices 10 to networking components and may be installed in the gaming device cabinet or external to the gaming device 10. The function of the GMU 126 is similar to the function of a network interface card connected to a desktop personal computer (PC). Some GMU's 126 have much greater capability and can perform such tasks as presenting and playing a game using a display (not shown) operatively connected to the GMU 126. In one embodiment, the GMU 126 is a separate component located outside the gaming device 10. Alternatively, in another embodiment, the GMU 126 is located within the gaming device 10. Optionally, in an alternative embodiment, one or more gaming devices 10 connect directly to a network and are not connected to a GMU 126.

Furthermore, one or more of the gaming devices 10 includes one or more data repositories for storing data. Examples of information stored by the gaming devices 10 include, but are not limited to, accounting data, maintenance history information, short and/or long-term play data, real-time play data, and sound data. The sound data may include, but is not limited to, audio files, sound clips, WAV files, mp3 files and sound files saved in various other formats. Furthermore, each gaming device 10 comprises an audio system (not shown) for outputting sound.

The gaming devices 10 are connected via a network to a network bridge 120, which is used for networking, routing and polling gaming devices, including slot machines. The network bridge 120 connects to a back end system 112. Optionally, the gaming devices 10 may connect to the network via a network rack 122, which provides for a few number of connections to the back end system 112. Both network bridge 120 and network rack 122 may be classified as middleware, and facilitate communications between the back end system 112 and the game management units 126. The network bridges 120 and network rack 122 may comprise data repositories for storing network performance data. Such performance data may be based on network traffic and other network related information. Optionally, the network bridge 120 and the network rack 122 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The back end system 112 may be configured to comprise one or more servers. The type of server employed is generally determined by the platform and software requirements of the gaming system. In one embodiment, as illustrated in FIG. 2, the back end system 112 is configured to include three servers: a game floor controller 114, a casino management server 116 and a casino database 118. The game floor controller 114 is a part of the player tracking system for gathering accounting, security and player specific information. The casino management server 116 and casino database 118 work together to store and process information specific to both employees and players. Player specific information includes, but is not limited to, passwords, biometric identification, player card identification, and biographic data. Additionally, employee specification information may include biographic data, biometric information, job level and rank, passwords, authorization codes and security clearance levels.

Overall, the back end system 112 performs several fundamental functions. For example, the back end system 112 can collect data from the game floor as communicated to it from other network components, and maintain the collected data in its database. The back end system 112 may use game floor data to generate a report used in casino operation functions. Examples of such reports include, but are not limited to, accounting reports, security reports, and usage reports. The back end system 112 may also pass data to another server for other functions. Alternatively, the back end system 112 may pass data stored on its database to floor hardware for interaction with a game or game player. For example, data such as a game player's name or the amount of a ticket being redeemed at a game may be passed to the floor hardware. Additionally, the back end system 112 may comprise one or more data repositories for storing data. Examples of types of data stored in the system server data repositories include, but are not limited to, information relating to individual player play data, individual game accounting data, gaming device accounting data, cashable ticket data, and sound data including optimum audio outputs for various casino settings.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method for tracking player's buy-in activity and enforcing player loss limits within a casino using a loss limit system, the activity and loss limits based on scheduled time sessions, the method comprising:

- providing a gaming device, wherein the gaming device includes a display screen, a player identification device, a monetary input device, and a user interface;
- identifying a player at the gaming device using the player identification device, wherein the loss limit system checks to confirm that the identified player is enrolled in the loss limit system, and if the player is not enrolled, a popup error message is presented and the player is prevented from playing the gaming device;
- receiving a loss limit amount and an associated time session;
- computing an amount of currency that is available for the identified player to spend, wherein if the amount of currency that is available for the identified player to spend is less than a smallest bill denomination accepted by the monetary input device, sending a message instructing the monetary input device that no currency may be accepted, and wherein if the amount of currency that is available for the identified player to spend is greater than a smallest bill denomination accepted by the monetary input device, sending a message instructing the monetary input device what currency may be accepted;
- accepting allowable monetary funds via the monetary input device for game play at the gaming device;
- re-computing an amount of currency that is available for the identified player to spend each time additional currency is accepted from the monetary input device, and only enabling currency denominations that will not allow the identified player to exceed a current player loss limit; and
- disabling the monetary input device for specific monetary denominations if the monetary funds attempted to be input into the monetary input device exceed the available funds amount, while enabling the monetary input device for specific monetary denominations within the available funds amount.

2. The method of claim 1, wherein identifying a player at a gaming device comprises identifying a player at a gaming device via a player identification device.

3. The method of claim 1, wherein accepting monetary funds for a game play at a gaming device comprises accepting monetary funds for game play at a gaming device via a monetary input device.

4. The method of claim 1, wherein the receiving of a loss limit amount and an associated time session is performed by a loss limit system.

5. The method of claim 4, wherein the calculating an available funds amount from the loss limit amount and the accepted monetary funds per the associated time session is performed by a loss limit system.

6. The method of claim 1, wherein the rejecting monetary funds for game play if the monetary funds value exceeds the available funds amount comprises:

rejecting monetary funds for game play if the monetary funds value exceeds the available funds amount by deactivating a monetary input device associated with the gaming device when monetary funds are attempted to be entered that are greater than the available funds amount.

7. The method of claim 1, further comprising notifying a player of a reason why the monetary funds were rejected.

8. The method of claim 7, wherein said notifying includes displaying the loss limit amount.

9. The method of claim 1, wherein said notifying includes displaying a time period remaining until the loss limit is reset.

10. A method for tracking player's buy-in activity and enforcing player loss limits within a casino using a loss limit system, wherein the activity and loss limits are based on scheduled time sessions, the method comprising:

providing a gaming machine having a player identification device and a monetary input device, wherein the player identification device is configured to receive a player card in a card reader;

deactivating the monetary input device from accepting currency while there is not an active player card inserted into the card reader;

receiving an active player card inserted into the card reader;

activating the monetary input device to accept currency after the player card has been inserted into the card reader, and the loss limit system has received a transmission confirming the player's identification, enrollment with the loss limit system, and current player loss limit;

computing an amount of currency that is available for the identified player to spend, wherein if the amount of currency that is available for the identified player to spend is less than a smallest bill denomination accepted by the monetary input device, sending a message instructing the monetary input device that no currency may be accepted, and wherein if the amount of currency that is available for the identified player to spend is greater than a smallest bill denomination accepted by the monetary input device, sending a message instructing the monetary input device what currency may be accepted;

re-computing an amount of currency that is available for the identified player to spend each time additional currency is accepted from the monetary input device, and only enabling currency denominations that will not allow the identified player to exceed a current player loss limit; and deactivating the monetary input device from accepting currency when the player card is removed from the card reader.

11. A method for tracking player's buy-in activity and enforcing player loss limits within a casino using a loss limit system, the activity and loss limits based on scheduled time sessions, the method comprising:

providing a gaming device, wherein the gaming device includes a display screen, a biometric player identification device, a monetary input device, and a user interface;

identifying a player at the gaming device using the biometric player identification device, wherein the loss limit system checks to confirm that the identified player is enrolled in the system, and if the player is not enrolled, a popup error message is presented and the player is prevented from playing the gaming device;

computing an amount of currency that is available for the identified player to spend, wherein if the amount of currency that is available for the identified player to spend is less than a smallest bill denomination accepted by the monetary input device, sending a message instructing the monetary input device that no currency may be accepted, and wherein if the amount of currency that is available for the identified player to spend is greater than a smallest bill denomination accepted by the monetary input device, sending a message instructing the monetary input device what currency may be accepted;

accepting allowable monetary funds via the monetary input device for game play at the gaming device; and re-computing an amount of currency that is available for the identified player to spend each time additional currency is accepted from the monetary input device, and only enabling currency denominations that will not allow the identified player to exceed a current player loss limit.

* * * * *

UNITED STATES PATENT AND TRADEMARK OFFICE

CERTIFICATE OF CORRECTION

PATENT NO. : 8,105,155 B2
APPLICATION NO. : 12/032348
DATED : January 31, 2012
INVENTOR(S) : Bryan M. Kelly et al.

It is certified that error appears in the above-identified patent and that said Letters Patent is hereby corrected as shown below:

In the Specifications:

Column 4, In line 35, insert --15-- after “13,”

Column 4, In line 57, remove “with in” and insert --within--

Column 6, In line 55, insert --dispenser-- after “bill”

Column 9, In line 19, change “swiping” to --swapping--

Column 9, In line 19, change “in” to --and--

Column 10, In line 5, remove “patrona” and insert --patrons--

Column 13, In line 37, remove “cash” after Patron

Column 16, In line 51, remove “,” after “10”

Signed and Sealed this
Thirtieth Day of April, 2013

Teresa Stanek Rea
*Acting Director of the United States Patent and Trademark Office*